(12) United States Patent
Albaghajati et al.

(10) Patent No.: US 9,798,327 B2
(45) Date of Patent: Oct. 24, 2017

(54) APPARATUS AND METHOD FOR DEPLOYING SENSORS

(71) Applicant: KING FAHD UNIVERSITY OF PETROLEUM AND MINERALS, Dhahran (SA)

(72) Inventors: Anas Mohammed Albaghajati, Dhahran (SA); Mohammad Tariq Nasir, Dhahran (SA); Lahouari Ghouti, Dhahran (SA); Sami El Ferik, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 170 days.

(21) Appl. No.: 14/990,840

(22) Filed: Jan. 8, 2016

(65) Prior Publication Data
US 2017/0199525 A1    Jul. 13, 2017

(51) Int. Cl.
*G06F 19/00* (2011.01)
*G05D 1/02* (2006.01)
(Continued)

(52) U.S. Cl.
CPC ......... *G05D 1/0214* (2013.01); *G05D 1/0238* (2013.01); *G05D 1/0246* (2013.01); *G06T 11/206* (2013.01); *H04B 7/18523* (2013.01); *H04N 5/225* (2013.01); *H04W 4/02* (2013.01); *G01V 1/168* (2013.01); *G05D 2201/0207* (2013.01)

(58) Field of Classification Search
CPC .................................................. G05D 1/0214
See application file for complete search history.

(56) References Cited

U.S. PATENT DOCUMENTS 6,167,332 A * 12/2000 Kurtzberg ............ G05D 1/0274
318/568.12
6,205,380 B1 * 3/2001 Bauer .................. G05D 1/0221
180/169

(Continued)

OTHER PUBLICATIONS

P.A.W. Batenburg, et al., "Reflection Seismology Systems for Planetary Geology: A Feasibility Study", 60th International Aeronautical Congress, IAC-09-A3.6.10, 2009, pp. 1-9.

(Continued)

*Primary Examiner* — Rachid Bendidi
(74) *Attorney, Agent, or Firm* — Oblon, McClelland, Maier & Neustadt, L.L.P.

(57) ABSTRACT

Described herein a robot assisted method of deploying sensors in a geographic region. The method of deploying sensors is posed as a Markovian decision process. The robot assigns each grid cell in a map of the geographic region a reward value based on a surface elevation of the geographic region and a soil hardness factor. Further, the robot determines an action for each grid cell of the plurality of grid cells, wherein the action corresponds to an expected direction of movement of the robot in the grid cell. The robot computes a global path as a concatenation of actions starting from a first grid cell and terminating at a second grid cell. The method monitors the movement of the robot on the computed global path and computes a second path based on a deviation of the robot from the global path.

14 Claims, 15 Drawing Sheets

(51) Int. Cl.
*H04N 5/225* (2006.01)
*H04B 7/185* (2006.01)
*H04W 4/02* (2009.01)
*G06T 11/20* (2006.01)
*G01V 1/16* (2006.01)

(56) References Cited

U.S. PATENT DOCUMENTS

| | | | | |
|---|---|---|---|---|
| 7,769,491 | B2 * | 8/2010 | Fukuchi | G05D 1/0251 382/106 |
| 8,075,226 | B2 | 12/2011 | Thompson et al. | |
| 2004/0117079 | A1 * | 6/2004 | Hulden | G05D 1/0217 701/23 |
| 2005/0131581 | A1 * | 6/2005 | Sabe | G06K 9/00201 700/245 |
| 2006/0149465 | A1 * | 7/2006 | Park | G01C 21/20 701/416 |
| 2007/0288156 | A1 * | 12/2007 | Neff | F41G 7/343 701/533 |
| 2009/0149990 | A1 * | 6/2009 | Myeong | G05D 1/0274 700/245 |
| 2009/0157566 | A1 * | 6/2009 | Grush | G01C 21/28 705/400 |
| 2012/0143372 | A1 * | 6/2012 | Roh | G05D 1/0217 700/255 |
| 2012/0143427 | A1 * | 6/2012 | Hoffman | G06Q 10/087 701/23 |
| 2014/0100690 | A1 * | 4/2014 | Wurman | G05B 19/4189 700/230 |
| 2014/0195049 | A1 * | 7/2014 | Im | G01S 5/0252 700/248 |

OTHER PUBLICATIONS

Christopher M. Gifford, et al., "Robotic Deployment and Retrieval of Seismic Sensors for Polar Environments", Proceedings of the 4$^{th}$ International Conference on Computing, Communications and Control Technologies (CCCT), vol. II, Jul. 2006, 6 pages.

Christopher M. Gifford, et al., "Robotic Approaches to Seismic Surveying", Journal of Automation, Mobile Robotics & Intelligent Systems, vol. 3, No. 3, 2009, pp. 13-25.

* cited by examiner

APPARATUS AND METHOD FOR DEPLOYING SENSORS

BACKGROUND

Field of Disclosure

The present disclosure relates to robot path planning. Specifically, the disclosure relates to a robot assisted method for deploying sensors using an efficient sensor deployment policy.

Description of Related Art

As the earth's population continues to grow, so does the demand for energy resources. The finite quantity of currently known energy resources has also spurred demand for new energy resources, and this demand for new energy resources has driven oil and natural gas exploration. Reflection seismology is a technique from geophysics which enables petrochemical industries to explore geographic regions without having to drill, in order to directly determine whether, and to what extent, oil and gas may be present.

A time-dependent perturbation of an elastic medium such as the earth's crust, generates elastic waves which propagate outward from the source regions. The reflection and scattering of these elastic waves, called seismic waves, can be used to characterize the structure of the scattering elastic medium. In reflection seismology, this is done by placing point sources and point receivers on the earth's crust. The point sources emit a known time-dependent perturbation, and the point receivers measure the earth's response at its surface. Determining the underground structure based on the response measured by the receivers is an inverse scattering problem. An accurate determination of the response of the earth's surface requires a large number of sampling points on the surface, and a seismic sensor deployed at each of these sampling points.

However, the geographic regions that contain oil and natural gas are frequently located in remote and desolate locations. Thus, the deployment of sensors in these regions is arduous and sometimes dangerous. Accordingly, there is a requirement for a technique of deploying sensors in an efficient manner.

SUMMARY

According to an embodiment of the present disclosure is provided a robot for automated deployment of a seismic sensor in a geographic region. The robot includes a satellite receiver and a plurality of inertial sensors configured to determine at least one of a location and an orientation of the robot; an imager configured to capture images; and circuitry. The circuitry is configured to generate a map of the geographic region, wherein the map includes a plurality of grid cells, a first grid cell including an initial starting point of the robot and a second grid cell including a target point corresponding to a location for deploying the seismic sensor, assign each grid cell a reward value based on at least one of a surface elevation of the geographic region in the grid cell and a soil hardness factor of the geographic region in the grid cell, determine an action for each grid cell of the plurality of grid cells, wherein the action corresponds to an expected direction of movement of the robot in the grid cell, the expected direction of movement in the grid cell maximizing a discounted sum of reward values of the grid cells, compute a global path as a concatenation of actions starting from the first grid cell and terminating at the second grid cell, monitor a current location of the robot based on at least one of the satellite receiver and the plurality of inertial sensors, to determine whether a deviation of the robot from the first path exceeds a predetermined threshold deviation, and compute a second path for the robot based on at least one of the monitored location of the robot and an obstacle being detected in the global path by the imager.

By one embodiment of the present disclosure is provided a method of automated deployment of a seismic sensor in a geographic region by a robot. The method includes: determining, by a satellite receiver and a plurality of inertial sensors, at least one of a location and an orientation of the robot; capturing by an imager, images of the geographic region; generating by circuitry, a map of the geographic region, wherein the map includes a plurality of grid cells, a first grid cell including an initial starting point of the robot and a second grid cell including a target point corresponding to a location for deploying the seismic sensor; assigning each grid cell a reward value based on at least one of a surface elevation of the geographic region in the grid cell and a soil hardness factor of the geographic region in the grid cell, determining an action for each grid cell of the plurality of grid cells, wherein the action corresponds to an expected direction of movement of the robot in the grid cell, the expected direction of movement in the grid cell maximizing a discounted sum of reward values of the grid cells, computing a global path as a concatenation of actions starting from the first grid cell and terminating at the second grid cell, monitoring a current location of the robot based on at least one of the satellite receiver and the plurality of inertial sensors, to determine whether a deviation of the robot from the first path exceeds a predetermined threshold deviation, and computing a second path for the robot based on at least one of the monitored location of the robot and an obstacle being detected in the global path by the imager.

By one embodiment of the present disclosure is provided a non-transitory computer readable medium having stored thereon a program that when executed by a computer causes the computer to execute a method of automatically deploying a seismic sensor in a geographic region by a robot. The method includes determining at least one of a location and an orientation of the robot; capturing images of the geographic region; generating a map of the geographic region, wherein the map includes a plurality of grid cells, a first grid cell including an initial starting point of the robot and a second grid cell including a target point corresponding to a location for deploying the seismic sensor; assigning each grid cell a reward value based on at least one of a surface elevation of the geographic region in the grid cell and a soil hardness factor of the geographic region in the grid cell, determining an action for each grid cell of the plurality of grid cells, wherein the action corresponds to an expected direction of movement of the robot in the grid cell, the expected direction of movement in the grid cell maximizing a discounted sum of reward values of the grid cells, computing a global path as a concatenation of actions starting from the first grid cell and terminating at the second grid cell, monitoring a current location of the robot based on at least one of the satellite receiver and the plurality of inertial sensors, to determine whether a deviation of the robot from the first path exceeds a predetermined threshold deviation, and computing a second path for the robot based on at least one of the monitored location of the robot and an obstacle being detected in the global path by the imager.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosed embodiments and many of the attendant advantages thereof will be readily obtained as the same becomes better understood by target to the following detailed description when considered in connection with the accompanying drawings, wherein like numerals reference like elements, and wherein.

DETAILED DESCRIPTION

The following descriptions are meant to further clarify the present disclosure by giving specific examples and embodiments of the disclosure. These exemplary embodiments are meant to be illustrative rather than exhaustive. The full scope of the disclosure is not limited to any particular embodiment disclosed in this specification, but rather is defined by the appended claims.

Figure 1:
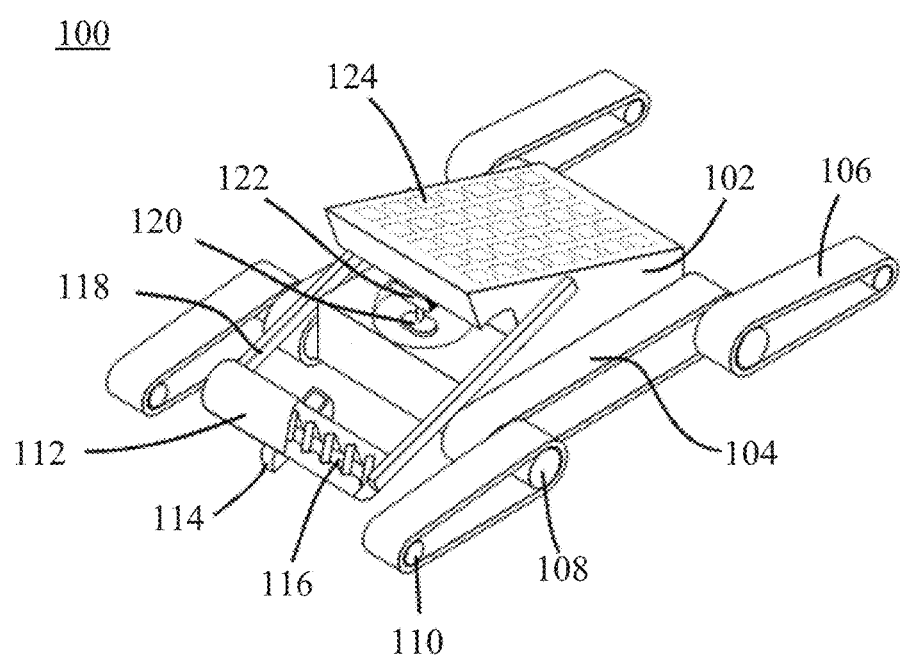
FIG. 1 illustrates a robot according to an embodiment.

FIG. 1 shows a robot 100 for deploying seismic sensors according to an embodiment of the disclosure. The robot 100 includes a chassis 102 mounted on two tracks 104, with one track disposed on each side of the robot chassis 102. Each track 104 has two track legs 106, one track leg 106 disposed at each end of track 104. Each track leg 106 includes a servomotor 108 for controlling an attitude of track leg 106, and a drive motor 110 for driving track leg 106. In one embodiment, robot 100 may use wheels instead of tracks 104 for locomotion.

Two arms 118 connect a cylinder 112 at a front end of the robot 100. The cylinder 112 is used for digging in soft soil and sand, using scoop 114. A screw 116 is disposed in the center of cylinder 112.

To dig in soft soil or sand using the cylinder 112 and the scoop 114, the robot 100 lowers cylinder 112 to the surface of the ground, and rotates cylinder 112 such that the scoop 114 scoops up (i.e., accumulates) the soft soil or sand as the cylinder 112 rotates. Specifically, the scoop 114 collects the soft soil or sand as the scoop 114 rotates through a bottom position, i.e., a position when the scoop 114 is disposed beneath the cylinder, and deposits the soft soil or sand in the cylinder 112, as the scoop 114 rotates through a top position, i.e., a position when the scoop 114 is disposed above the cylinder 112. Further, the scoop 114 deposits the accumulated sand/soil onto the threads of screw 116 via openings in the cylinder 112.

According to one embodiment, as the screw 116 turns, the soft soil or sand follows the threads of screw 116 and is moved to an end of cylinder 112, where it is stored for later use, for example, to cover a deployed seismic sensor. Reversing the direction of rotation of cylinder 112 causes soft soil or sand stored in the cylinder 112 to move back to the center of the cylinder 112, and deposits the soft soil or sand stored in cylinder 112 to the surface of the ground.

According to one embodiment, the robot 100 includes an imager 122 configured for capturing images that are used in path (route) planning and depth reconstruction. The imager 122 is rotatably mounted on imager base 120. In one embodiment, imager 122 includes two or more cameras configured to produce stereo imagery. Solar panel 124 is mounted on the chassis 102 of the robot 100, to recharge the batteries of robot 100 and extend its operational range and time required between battery recharges.

Figure 2A:
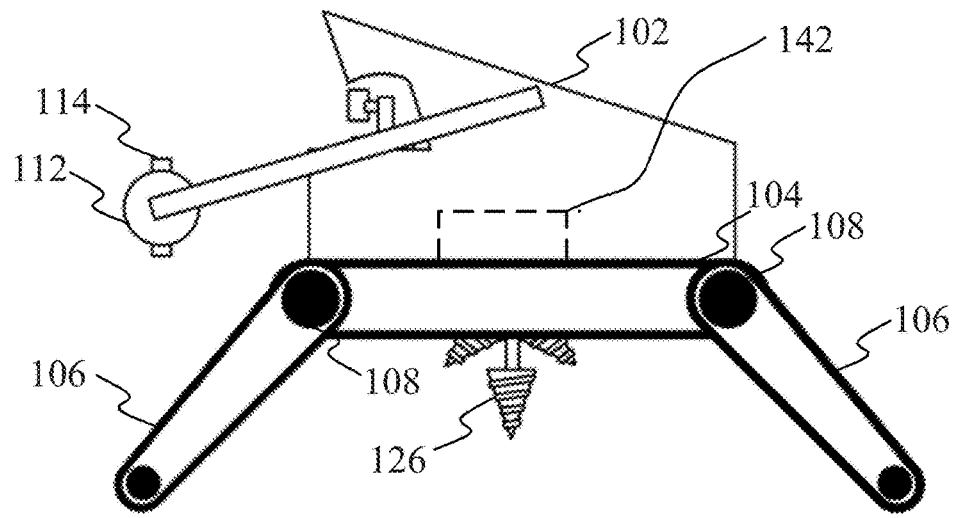
FIG. 2A and FIG. 2B illustrate exemplary robot orientations.
Figure 2B:
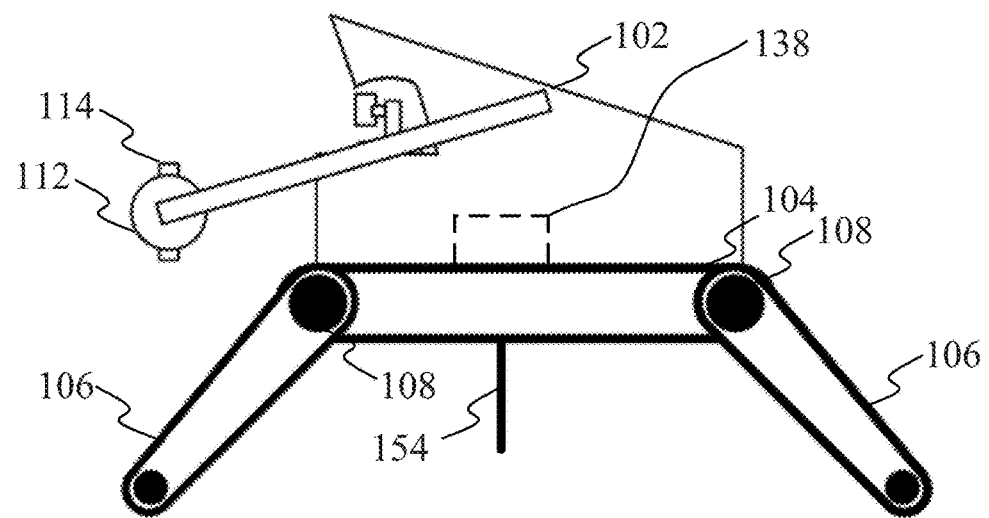

FIG. 2A and FIG. 2B depict the robot 100 having track legs 106 positioned at an angle relative to track 104. The angular position of the track legs 106 can be adjusted via servomotors 108. It must be appreciated that the track legs 106 are not limited to the orientations as depicted in FIGS. 2A and 2B, but rather are adjustable to a range of angles in order to traverse a variety of terrain.

FIG. 2A illustrates a position of drill assembly 142 inside robot 100, with drill 126 retractably mounted under robot 100 so as to be able to be withdrawn completely into chassis 102. Drill 126 may be equipped with a variety of drill bits for different soil types, and may be used to bore a hole for deploying a seismic sensor.

FIG. 2B illustrates a position of soil test assembly 138 inside robot 100, with soil test probe 154 retractably mounted under robot 100, so as to be able to be withdrawn completely into chassis 102. Soil test probe 154 may be used for determining a hardness of the ground beneath robot 100. By one embodiment, the hardness of the ground can be used in robot path planning and/or to determine a location for deployment of a seismic sensor. The soil test assembly 138 and the drill assembly 142 are both disposed inside the chassis 102, and control the movements of the drill 126 and soil test probe 154, respectively. Further details regarding the soil test assembly 138 and the drill assembly 142 are described later with reference to FIG. 4.

Figure 3:
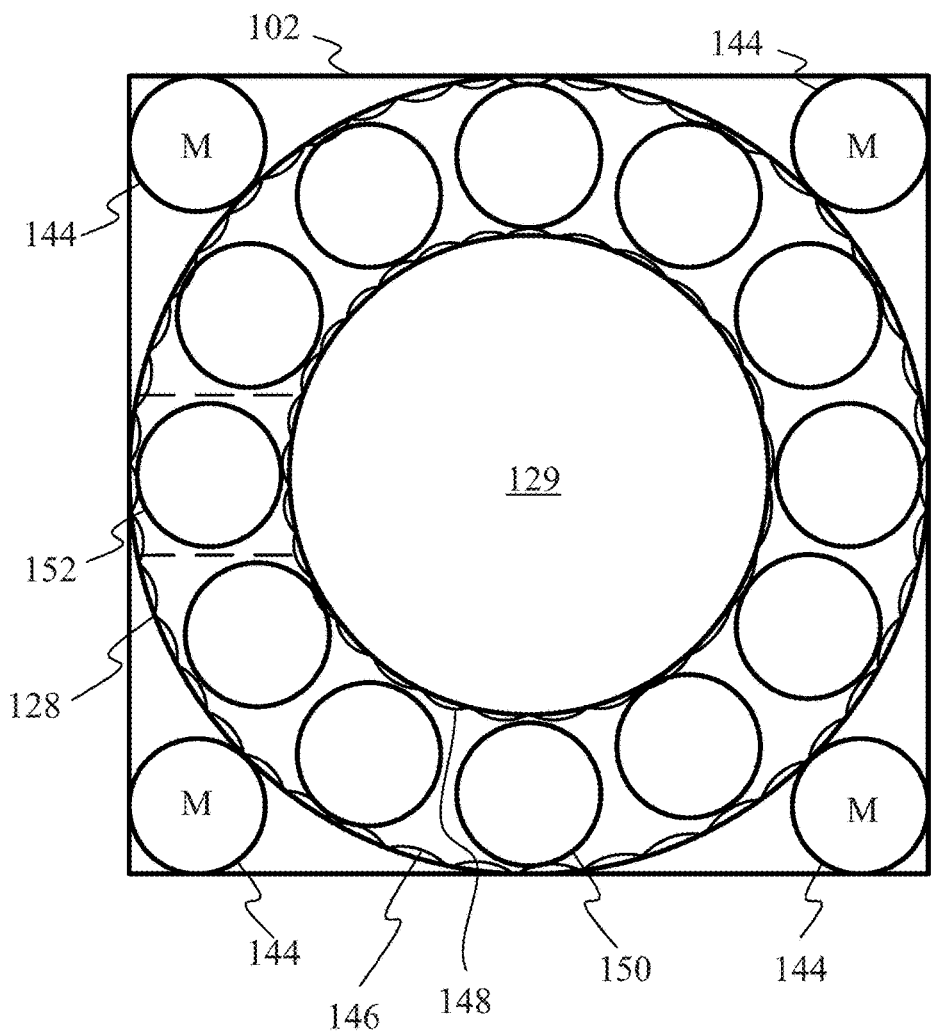
FIG. 3 illustrates according to an embodiment, an exemplary robot chassis.

FIG. 3 depicts an interior view of the robot chassis 102 according to one embodiment of the present disclosure. Chassis 102 houses carousel 128, which is rotatably mounted on inner raceway 148 and outer raceway 146. Carousel 128 has a series of sensor slots 150, each of which is able to hold a seismic sensor. The carousel 128 is driven by a set of carousel motors 144. Carousel 128 rotates seismic sensors to a sensor load/unload position 152, which is the position from and to which, seismic sensors may be deployed and recovered. The chassis 102 has an internal compartment 129 that houses a control circuitry (described later with reference to FIG. 10) of the robot 100.

Figure 4:
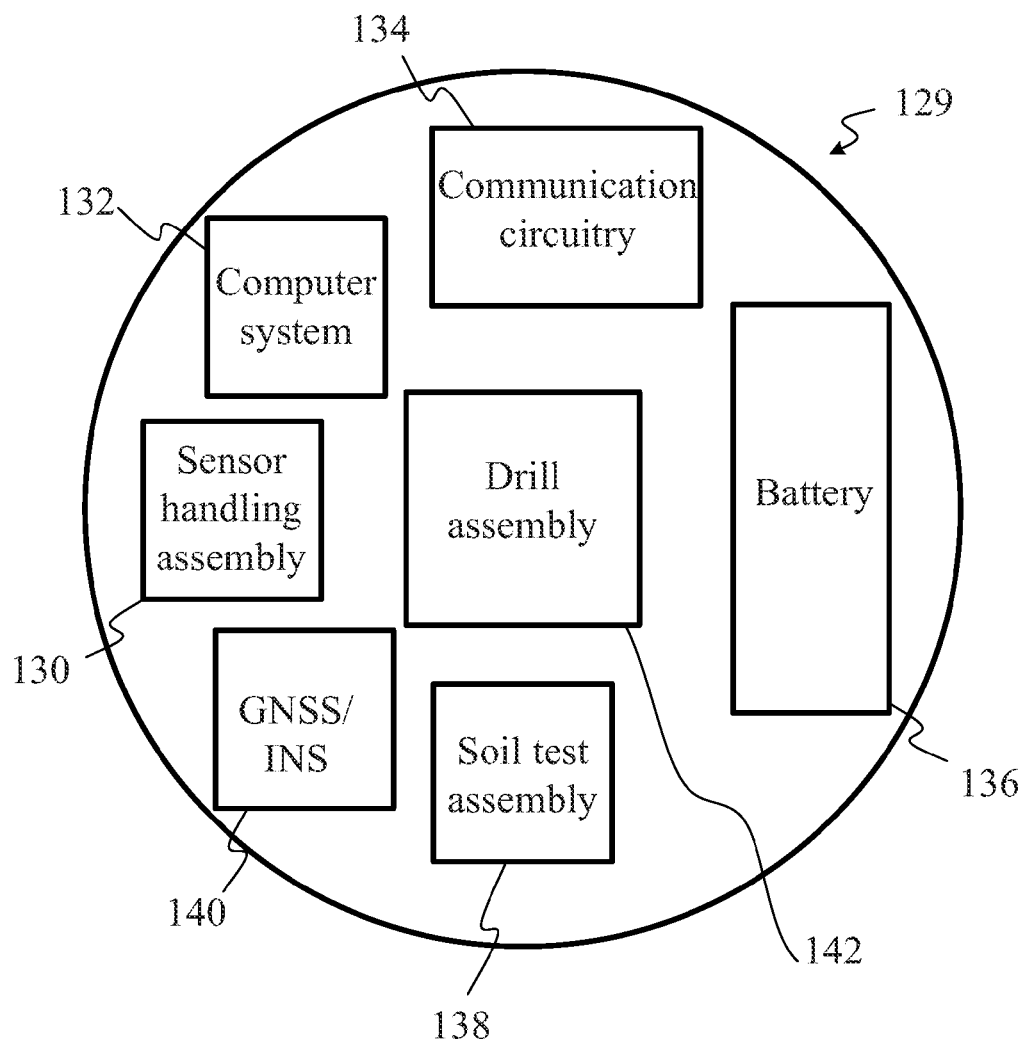
FIG. 4 illustrates according to an embodiment, an exemplary portion of the robot chassis.

FIG. 4 depicts the internal compartment 129 of the robot chassis 102. The internal compartment 129 houses a sensor handling assembly 130 that includes a robotic arm and control circuitry for deployment and recovery of seismic sensors from the sensor load/unload position 152. The carousel 128 is rotatably mounted so that the motors 144 can rotate any sensor slot 150 in the carousel 128 to the sensor load/unload position 152.

The robot 100 is able to communicate with a base station via communications circuitry 134. Communication circuitry 134 may be a radio transceiver that is configured to communicate with a base station, for example, in accordance with a cellular standard such as the Global System for Mobile Communications (GSM) standard, or using another radio-frequency communication method or standard. Communication circuitry 134 provisions for the robot 100 to transmit the robot's location and/or a location of a deployed seismic sensor to the base station. Further, the communication circuitry 134 also provisions for reporting global or local map updates, which could be used by other robots disposed near the robot 100 for navigation purposes. The robot 100 is also able to receive map and programming updates from the base station via communications circuitry 134.

A battery 136 powers the robot 100. The robot 100 further includes a solar panel 124 for charging the battery 136. In one embodiment, in order for robot 100 to have a good transmission and/or duration range, the battery 136 may be made out of a material having a high energy density, such as Nickel-Metal Hydride (NiMH), Lithium ion, or Lithium-ion polymer. The battery 136 may include a combination of a plurality of batteries arranged in series and/or in a parallel fashion in order to meet the voltage and power requirements for the robot 100.

According to one embodiment, the soil test assembly 138 controls a retractable soil test probe 154, in order to determine a hardness of the ground at the location of the robot 100. In one embodiment, the soil test probe 154 is a light rod, which is driven downward pneumatically by the soil test assembly 138. The distance of downward displacement below a level of track legs 106 is used to characterize a hardness of the ground. The results of the soil hardness measurements may be recorded by computer system 132 for use in path planning and seismic sensor placement, and transmitted via communications circuitry 134 back to the base station.

Robot 100 also includes a Global Navigation Satellite System (GNSS) receiver and Inertial Navigation System (INS) 140. The GNSS/INS 140 is used for receiving and decoding of a GNSS signal, such as a Global Positioning System (GPS) signal, in order to accurately determine a location of the robot 100. The GNSS/INS 140 also includes various micro-electromechanical systems (MEMS) inertial sensors for determining the robot's pose (orientation of the robot 100), as well as tracking the location of the robot using inertial navigation. The INS information includes the orientation of the robot and inertial information, such as linear and angular accelerations, which can also be used for robot navigation.

According to one embodiment, the robot 100 may encounter problems while navigating in remote areas. For instance, while navigating in remote areas, the GNSS receiver may receive a signal having a poor signal strength from the satellites, and thus may not be able to determine the location of the robot accurately. The resulting loss of GNSS location data is referred to herein as a "dropout." In such scenarios, the location of robot 100 is determined using the GNSS signal at regular intervals, for example at 1 Hz, combined with INS information. Thus, location information required between GNSS updates, or while the GNSS satellites are obscured and a GNSS position cannot be calculated directly, the robot's location is extrapolated from the GNSS data using the INS data. Accordingly, a position of robot 100 can be accurately determined, even if there are dropouts in the GNSS signal, which prevent location determination based only on the GNSS signal.

By one embodiment, the MEMS inertial sensors may be configured to determine whether the robot has shifted from a global or local path, an inclination magnitude of the robot, whether a track disposed on the robot 100 has slipped on the terrain (for example, via a rotation of the robot when linear motion was indicated), and various other measurements. The inertial sensors reading are monitored by computer system 132, and allow the computer system to update local maps and computed path calculations based on limiting conditions. For example, it may have been determined that a particular robot is unstable on inclines of greater than 30 degrees. Computer system 132 uses the inclination angle determined by GNSS/INS 140 to determine whether the terrain along a current path of the robot has exceeded the maximum inclination angle, and a whether a new path must be calculated. Examples of MEMS devices which may be included in GNSS/INS 140 include Coriolis gyros, fiber-optic gyros, laser-ring gyros, accelerometers, and MEMS compasses, and the like.

Drill assembly 142 may be equipped with a single drill or multiple drills, which may be interchanged based on a determination of the hardness of the soil or sand beneath robot 100. For example, a drill for soft soil could have a sharper point angle, lower spiral or rate of twist, and larger flutes for removing soil or sand from a hole. In contrast, a drill for firm soil could have a larger point angle, a higher spiral or rate of twist for an increased mechanical advantage in drilling, or hardened edges for cutting through the firm soil. The drill assembly 142 retracts the drill 126 into chassis 102 when not in use, in order to allow free motion of the robot 100 over various types of terrain.

In order for the robot 100 to deploy a seismic sensor, the robot 100 must traverse from an initial location point, to a target location point where the seismic sensor is to be deployed. In traversing from the initial location point to the target location point, a straight-line path between the two points may not be feasible for the robot to take, due to soil permeability conditions that make the straight-line path non-traversable. Accordingly, by one embodiment, in robot path planning, the terrain is characterized based on information such as digital elevation maps (DEMs), visible imagery from aircraft or satellites, LIDAR surveys, and the like. Accordingly, knowledge of the terrain is used to construct a map, which is a representation of an area of the terrain containing the initial point, the target point, and permeability information of the terrain. Further, the robot's path from the initial point to the target point is calculated using the map.

However, in practice it may be possible that the robot does not traverse the calculated path due to uncertainties. For instance, the computed path may include regions that comprise soft soil or sand, regions that may include a steep incline, or the like. Such uncertainties in the computed path may result in track slippage of the robot, thereby causing errors in the calculated position and direction of travel of the robot. Other uncertainties such as change in soil condition, presence of an obstacle in the computed path, and the like, may pose further restrictions in the robot traversing the computed path. Thus, for instance, while the robot may be attempting to move in a forward direction along the calculated path, there is a possibility that the robot deviates from the calculated path.

According to one embodiment, upon accounting for the uncertainties in the calculation of the path, changes the path finding problem from a deterministic problem to (which assumes that the robot's attempt in moving in a particular direction is always successful), to a non-deterministic problem. The non-deterministic problem is characterized herein as a problem wherein the result of the robot's attempt to move in a particular direction is represented statistically, i.e., the motion is not necessarily in the calculated direction. Accordingly, the path determination problem is computing a path for the robot to traverse from the initial point to the target point, while accounting for the above described path uncertainties. By one embodiment, and as described below, the robot path finding problem is modeled as a non-deterministic Markov Decision Process (MDP).

The Markov Decision Process requires as input, a map representing an area of the terrain including the initial point and the target point, and information of the terrain obtained via the digital elevation maps (DEMs), visible imagery from aircraft or satellites, LIDAR surveys, and the like. The map is further divided into an array of grid cells, for example, the map is divided into an array of square grids. It must be appreciated that the shape of the grid cells may be rectangular, polygonal or the like. The grid cell containing the initial point is referred to herein as the initial grid cell, whereas the grid cell containing the target point is referred to as the target grid cell.

Based on information from the map of the terrain, the grid cells that cannot be traversed by the robot are identified as non-passable. Non-passable grid cells could be located in portions of the map that include water, or portions of the map having terrain slopes that exceed a predetermined threshold value. Note that the passable grid cells are the grid cells which are not identified as non-passable.

By one embodiment, the passable grid cells, except for the target grid cell, are assigned a reward value based on the terrain information of the grid cell obtained from the map. The reward values may be positive, negative, or zero. Larger, positive reward values characterize grid cells corresponding to map areas with more favorable terrain for robot movement, whereas smaller, more negative reward values characterize grid cells corresponding to map areas with less favorable terrain for robot movement.

In one embodiment, the terrain information may be elevation information, for example elevation information obtained from a DEM, and the computer system (described later with reference to FIG. 10) computes a maximum value and/or an average value of a slope, $\eta$, of the terrain in the map area corresponding to each passable grid cell. A small value of the calculated slope $\eta$ indicates that a map area includes little or no elevation change. In contrast, a large value of the slope $\eta$ indicates a map area with large elevation changes. Accordingly, by one embodiment, the reward values are assigned based on a parameter, $\alpha$, which characterizes the ability of the robot to move on sloped terrain. For a grid cell having slope $\eta$ with $0 \leq \eta < \alpha$, the reward value assigned for the grid cell is +1. Consequently, for a grid cell having slope $\eta$ with $\alpha \leq \eta < 2\alpha$, the reward value assigned for the grid cell is 0. Further, for a grid cell having slope with $n\alpha \leq \eta < (n+1)\alpha$ for $n \geq 2$, the reward value assigned for the grid cell is $-(n-1)$, wherein the parameter n corresponds to a positive integer. Accordingly, the reward value assigned for each grid cell reduces with increasing terrain slope of the grid.

Furthermore, the target grid cell is assigned a large, positive reward value in order to persuade the robot to reach the target point Details pertaining to the assignment of a reward value to the target grid cell are described below.

Figure 5A:
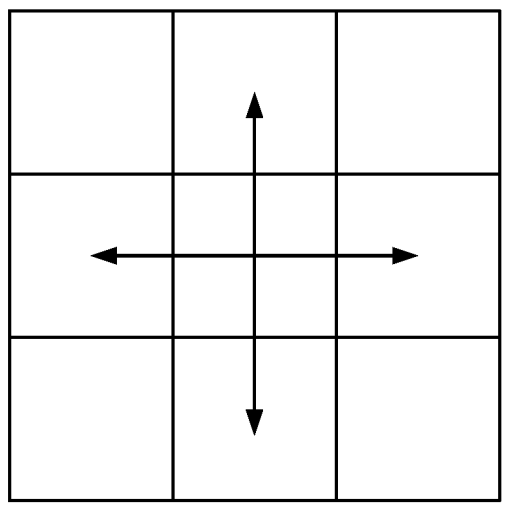
FIG. 5A, FIG. 5B, and FIG. 5C illustrate exemplary grid cell arrangements and corresponding robotic path directions according to embodiments.
Figure 5B:
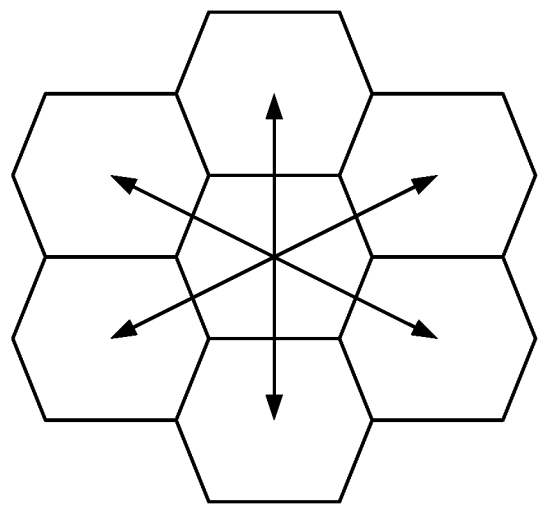
Figure 5C:
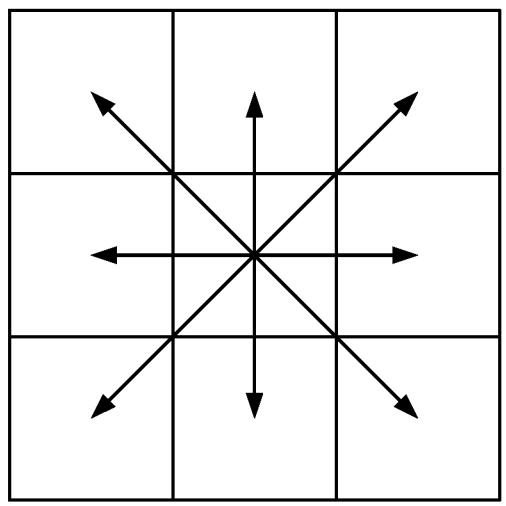

In the MDP model, at each grid cell, the robot performs a number of actions. For instance, a robot action at a grid cell may include determining a direction of a plurality of possible directions, in which the robot attempts to move. For example, as depicted in FIG. 5A, at each grid cell, the robot may move in 4 different directions north, south, east, and west. Alternatively, the robot may move in 6 different directions as shown in FIG. 5B or may move in 8 different directions as shown in FIG. 5C. It must be appreciated that an arbitrary path drawn on the map can be approximated with greater level of accuracy by using an MDP model that includes smaller grid cells and that which accommodates more directions in which the robot may move.

Two grid cells are sequential in an MDP model if the two grid cells are contiguous (positioned adjacent to each other) and there is a direction in the MDP model which provisions for the robot to move from one grid cell to the next cell. Thus, not all contiguous grid cells are sequential, and moreover sequential grid cells in an MDP model having 8 possible directions of movement for each grid cell (as depicted in FIG. 5B) may not be sequential in an MDP model that includes 4 possible directions of movement for each grid cell. Accordingly, in the MDP model, a path from a first grid cell to a second grid cell includes a series of sequential grid cells starting with the first grid cell and ending at the second grid cell.

Figure 6:
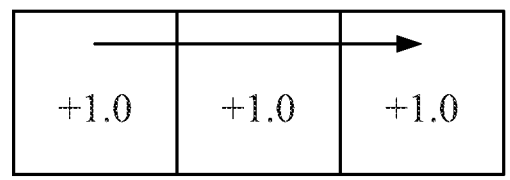
FIG. 6 illustrates assigning reward values to grid cells and calculating a value for a path in one embodiment.

By one embodiment, the value of a path (reward value) in an MDP model traversed by the robot is a sum of the reward values of the grid cells on the path. For example, FIG. 6 depicts three grid cells, with each grid cell assigned a reward value of +1. A path moving from left to right across the cells, as indicated by the arrow in FIG. 6, accumulates a total reward value of 3.

Further, by one embodiment, a discount factor is applied to the grid cells to obtain discounted reward values for the grid cells. For instance, the discount factor may be a multiplicative factor $\gamma (0 \leq \gamma < 1)$, that is iteratively applied to the reward values of the grid cells along a path to produce the discounted reward values. By one embodiment, a value of the discount factor $\gamma$, which is strictly less than one assures the convergence of the path finding problem. Specifically, utilizing a discount factor that is strictly less than one, guarantees that the robot will traverse from the initial point to the target point. The precise value of the discount factor is determined based on parameters such as a life of the robot battery, a distance between the initial point and the target point, and the like that are described below in detail.

Note that the reward value of a path in an MDP model that utilizes a discount factor is the sum of the discounted reward values of the grid cells on that path. For example, assuming the discount factor $\gamma$ to be 0.9 for the path shown in FIG. 6, wherein each grid cell was originally assigned a reward value of +1, the value of the path is the sum of the discounted reward values of the grid cells along the path: $1+(0.9)*1+(0.9)^2*1=2.71$. Note that in the example of FIG. 6, the discount factor is applied in geometrically iterative manner.

However, any other technique of applying the discount factor to the grid cells is within the scope of the present disclosure.

Figure 7:
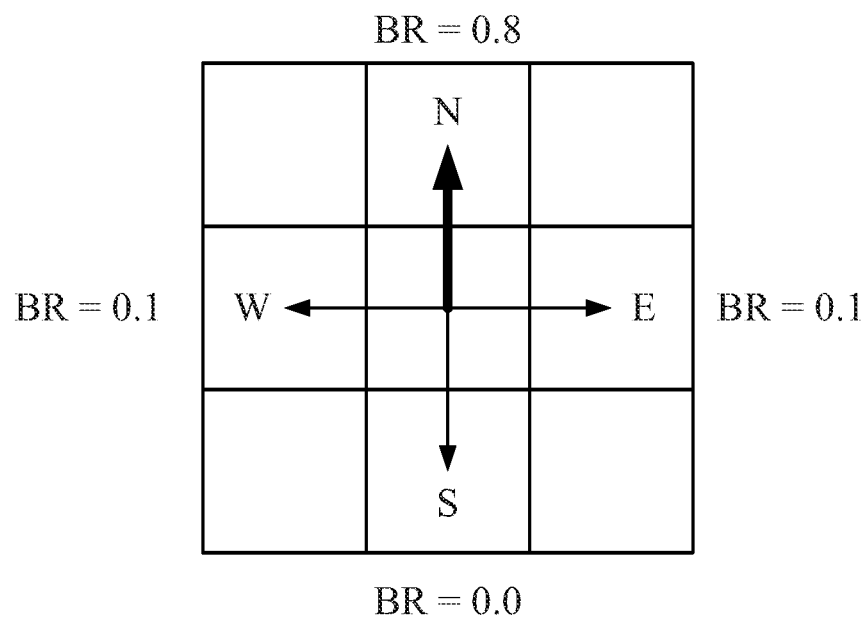
FIG. 7 illustrates branching ratios of a grid cell according to one embodiment.

According to one embodiment, the robot also computes a branching ratio for the grid cells. The branching ratio represents the non-deterministic factor in the robot movement. The branching ratio corresponds to the fractional distribution of resulting directions of motion, among all possible directions of motion, at a given grid cell and chosen direction of motion. For example, in an MDP model with four possible directions of motion, when attempting to move in any cardinal direction there could be an 80% chance that the motion is successful, a 10% chance that the robot turns to the right, a 10% chance that the robot turns to the left, and a 0% chance that the robot reverses course. In this case, if the robot attempted to move in the north direction, the branching ratios would be assigned as shown in FIG. 7.

The non-zero branching ratios along non-intended directions of motion are part of the non-deterministic MDP model. In a deterministic model, the branching ratio would always be 1.0 in the intended direction of motion and 0.0 along all other possible directions.

Additionally, by one embodiment, the robot determines a policy that assigns an action corresponding to a direction of motion of the robot, to each passable grid cell, except the target grid cell. The target grid cell is not assigned a direction of motion since it represents the location where a sensor is to be placed.

By one embodiment, an optimal policy determined by the robot is a policy having a maximum average value over all paths from the initial grid cell to the target grid cell. The optimal policy represents the best possible movement direction for the robot to reach the target grid cell for every passable grid cell in the global map.

The above described features implemented by the robot in traversing from the initial point to the target point are performed by the computer system 132 of the robot as depicted in FIG. 4. The computer system 132 includes a processor/circuitry (described later with reference to FIG. 10) that controls the robot's operation. The processor may perform all calculations, process commands, and control the functions of robot 100, including sensors and controllers for motors, encoders, on-board electronics, and imagers. Furthermore, the processor performs all calculations pertaining to pathfinding and navigation of the robot 100, determination of optimal policies, global and local map calculations, global and local path planning, and the like.

The computer system 132 may be implemented in many different ways, such as a controller device or system-on-a-chip device, and the like. The computer system 132 also includes memory for storing all required information, including information such as global and local maps, digital elevations for path planning, actual paths followed by the robot, and locations at which sensors have been deployed. Furthermore, the processing of images acquired by the imager 122 is performed by the computer system 132. The computer system 132 may use, for example, stereo image depth reconstruction to calculate three-dimensional terrain data.

The computer system 132 may also model the movement of the robot to the target point as a stochastic control process, a MDP, and solve the equations to determine a path from the initial point to the target point. In one embodiment, an optimal movement policy is determined from a global map, whereafter a global path is determined according to the optimal movement policy. The optimal policy is determined by assigning reward values to the various areas (grids) of the map and calculating an optimal path that maximizes the total reward over the entire path. An inefficient path, for example, may correspond to a path that brings the robot to the target point after a number of steps, such that the battery 136 may be exhausted. Accordingly, the inefficient paths need to be discriminated from an efficient path that brings the robot to the target point more directly. In one embodiment, longer paths are discriminated from shorter paths by assigning a small negative reward to every grid cell except the target grid cell.

In one embodiment, longer paths are discriminated from shorter paths by multiplying the reward value at each step by a discount factor. A discount factor of 1.0 weights future rewards equally with current rewards. However, a discount factor of less than one, weights current rewards higher than future rewards.

Furthermore, longer paths will tend to have a lower value than shorter paths, thereby forcing the optimal movement policy towards shorter paths. Thus, an optimal policy which maximizes the total reward tends to move away from areas which have a negative reward and toward areas that have a positive reward.

To this end, the computer system 132 stores a global map of a geographic area including the initial location, of the robot 100, and a target point where a seismic sensor is to be deployed. The global map is divided into a plurality of grid cells, wherein each grid cell of the plurality of grid cells is characterized (via the reward function) based on available information corresponding to the suitability of the region for traversal by the robot 100. By one embodiment, the characterization of the grid cell can be made before deployment of the robot, whereafter the global map is stored in memory. Alternatively, by one embodiment, the characterization of the grid cell can be made by the computer system 132, as the robot navigates toward the target point using data derived from depth reconstructed imagery along its path or derived from the soil test data acquired by the soil test assembly 138.

By one embodiment, the characterization of the global map by the computer system 132 could also be performed in a hybrid manner. Specifically, a preliminary map characterization can be performed before deployment of the robot and stored in memory, whereafter the map characterization is updated by the computer system as the robot traverses the geographic area and records local data.

The grid cells could be classified as non-traversable or non-passable, for example, if there is water accumulation in that portion of the map, or the terrain is determined to be too rocky for the robot 100 to traverse. For determining an optimal movement policy, movement into a non-traversable square is prohibited. Areas in the global map that are passable could be assigned reward values characterizing the difficulty with which the robot 100 would be expected to traverse the area.

For instance, in a geographic area (grid within the global map), in which it is known that the movement of the robot is not restricted, but the speed is affected, e.g., in a grassy area, a small negative reward value, such as −0.1, could be assigned. Alternatively, in an area that is moderately difficult for the robot to traverse, a larger negative reward value, such as −1.0, could be assigned.

A negative reward value tends to push an optimal movement policy (and thus the robot's global path) away from that area. In areas where the robot would be expected to travel in an unimpeded manner, a neutral value such as 0.0 could be assigned. An area which would be favorable for the robot to traverse could be assigned a positive reward value such as 1.0. In doing so, the optimal movement policy (and thus the robot's global path) is drawn towards that area. Furthermore, the target point where the seismic sensor is to be deployed could be assigned a large reward value, such as +10, in order to ensure that the optimal movement policy will route paths to the target point.

Since the optimal movement policy will drive the robot along a path having the largest overall reward, the target point should always have the largest reward value, and the reward value of the target point should be sufficiently large such that the optimal movement policy will produce acceptable paths. For example, if there were a second location in the global map which was assigned a reward value nearly equal to the target point, and that second location was easily reachable, while the target point was very difficult to reach, the maximum reward optimal policy may simply divert the robot toward the second location. Such as situation can be avoided by increasing the reward value assigned to the target point.

It must be appreciated that the above described exemplary reward values may be tailored to the conditions of the geographic area and the capabilities of the robot. The reward values may also be determined empirically, by operating the robot in the terrain and choosing reward values which produced the best paths for that robot in that environment. Thus, with the knowledge of the global map, the unpassable regions, and the computed reward values, the computer system 132 calculates an optimal movement policy. Specifically, given the starting point of the robot and the target point for deployment of the seismic sensor, the optimal movement policy will give the optimal order in which the grid squares in the global map should be traversed. Based on the optimal movement policy, the computer system 132 calculates a global path, for example, by determining a path that traverses along the center of the grid cells that are deemed passable.

Figures 8A, 8B:
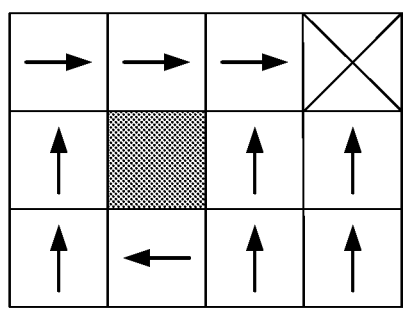
FIG. 8A, FIG. 8B, FIG. 8C, and FIG. 8D illustrate a global map, rewards, holes, an optimal policy, and a global path according to an embodiment.
Figures 8C, 8D:
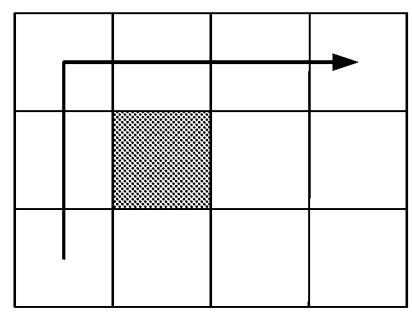

The above described process of computing the global path is illustrated in one exemplary embodiment in FIGS. 8A through 8D. Turning to FIG. 8A, is depicted a global map divided into a plurality of grids which include the initial point of the robot "S" and the target point "G." FIG. 8B shows an exemplary assignment of reward values, where the grid cells having a zero reward value are left blank. The reward values are assigned to a grid cell to reflect the suitability of the terrain in the area of the global map corresponding to grid cells. FIG. 8B also shows a non-traversable square, depicted as a shaded grid cell. FIG. 8C shows an exemplary optimal movement policy. The optimal movement policy assigns an action (direction to traverse) to every grid square in the global map except for the non-traversable grid cells and the target grid cell.

A flowchart outlining the steps for calculating the optimal movement policy is discussed below with reference to FIG. 13. FIG. 8D shows a global path which connects the starting point to the target point, passing through the centers of the grid cells. The global path is in accordance with the optimal movement policy, which can be seen from the fact that in each grid cell of the global map, the global path moves in the same direction as that indicated by the optimal movement policy in FIG. 8C.

Ideally, the robot 100 will be able to navigate from the initial point and arrive at the target point using the calculated optimal movement policy and global path. However, this may not always be the case. For example, if there is a dropout period in the GNSS signal, the robot 100 will continue to navigate along the global path using INS. When the GNSS signal is acquired again after the dropout period, and the robot 100 is able determine a current location, it may be possible that the robot is within a grid cell containing a portion of the global path, but the current location of the robot is not within an allowable tolerance limit of the global path. Specifically, a deviation of the current position of the robot from the global path (passing through the grid cell) may be greater than a predetermined threshold distance.

In one embodiment, the robot 100 uses the imager 122 to capture stereo imagery, which is imagery of a same scene from two slightly different perspectives. For example, the imager 122 can include dual bore-sighted cameras, with the space between the cameras providing the slightly different perspectives. Capturing two images of a scene with the dual cameras of imager 122 gives stereo imagery of the scene. The computer system 132 uses the stereo imagery to calculate a three-dimensional depth reconstruction of the local terrain, which is stored as a local map. The local map is a digital elevation map (DEM) of the area of terrain which has been imaged, and gives a three-dimensional terrain reconstruction of the area imaged.

According to one embodiment, the robot may determine (based on images captured by the camera disposed on the robot), that there is an obstacle in the global path. Further, the robot may determine that area portion of the global path may not be traversable. In such instances, the processor computes a local path defined herein as a detour around an obstacle on the global path (FIG. 9B). Accordingly, of the capability of the computer system 132 to calculate a global path as determined by a stochastic model, coupled with the capability to compute a local path dynamically by using image depth reconstruction provides an optimal sensor deployment policy for the robot.

Computer system 132 is also configured to calculate a local path in response to a location determination from GNSS/INS 140 data that robot 100 is more than a predetermined distance off of the global path, or in response to a determination by computer system 132 (based on the three-dimensional depth reconstruction of the local terrain) that an obstacle exists on the global path. According to one embodiment, the computer system 132 uses soil hardness data obtained from soil test assembly 138 using soil test probe 154 combined with local terrain data obtained from the three-dimensional depth reconstruction to calculate the local path.

Figure 9A:
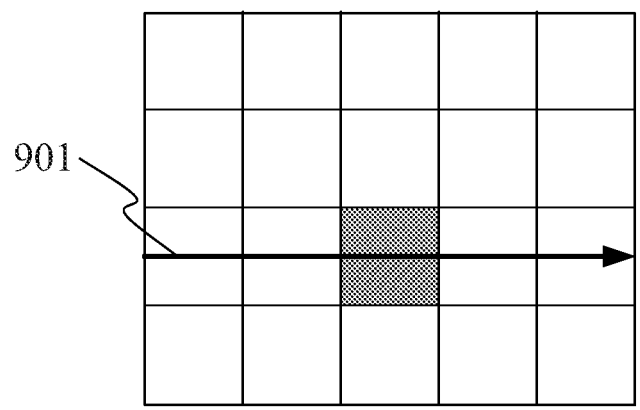
FIG. 9A depicts a global path with an obstruction.
Figure 9B:
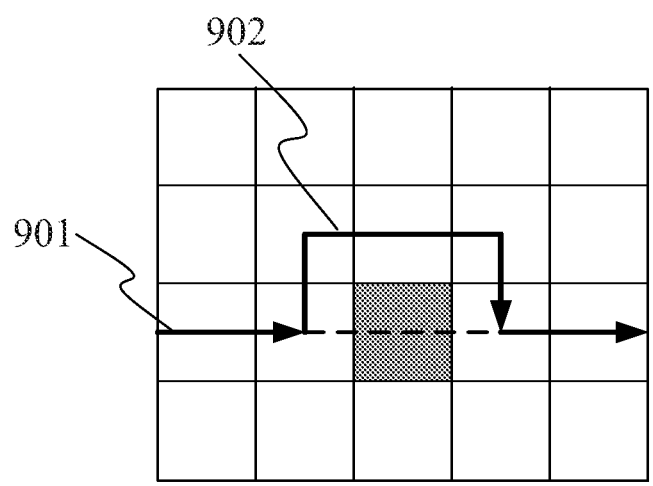
FIG. 9B depicts a local path calculated to circumvent the obstruction by one embodiment.

The process of computing a local path as described above is illustrated in one exemplary embodiment in FIGS. 9A and 9B. FIG. 9A shows a map divided into a plurality of grids. The map includes a global path 901. The computer system 132 may determine based on the three-dimensional depth reconstruction of the terrain that an obstacle or non-traversable area of terrain, represented by the shaded square may exists on the global path. For example, a large rock which the chassis 102 of the robot 100 cannot clear, or a small but steeply sloped area of terrain which exceeds the robot's tolerance for sloped terrain, could be obstructions in the global path. Upon such determinations, the computer system 132 calculates a local path (FIG. 9B) using a deterministic algorithm (an embodiment of which is described below in more detail) to navigate around the obstacle and return to the global path. FIG. 9B shows the map with local path 902, which is a detour in the path of the robot. After traversing the local path 902, the robot 100 returns to the global path 901.

Each of the above described embodiments may be implemented by one or more processing circuits included in the computer system 132. A processing circuit includes a programmed processor (for example, processor 1003 in FIG. 10), as a processor includes circuitry. A processing circuit also includes devices such as an application-specific integrated circuit (ASIC) and circuit components arranged to perform the recited functions.

Figure 10:
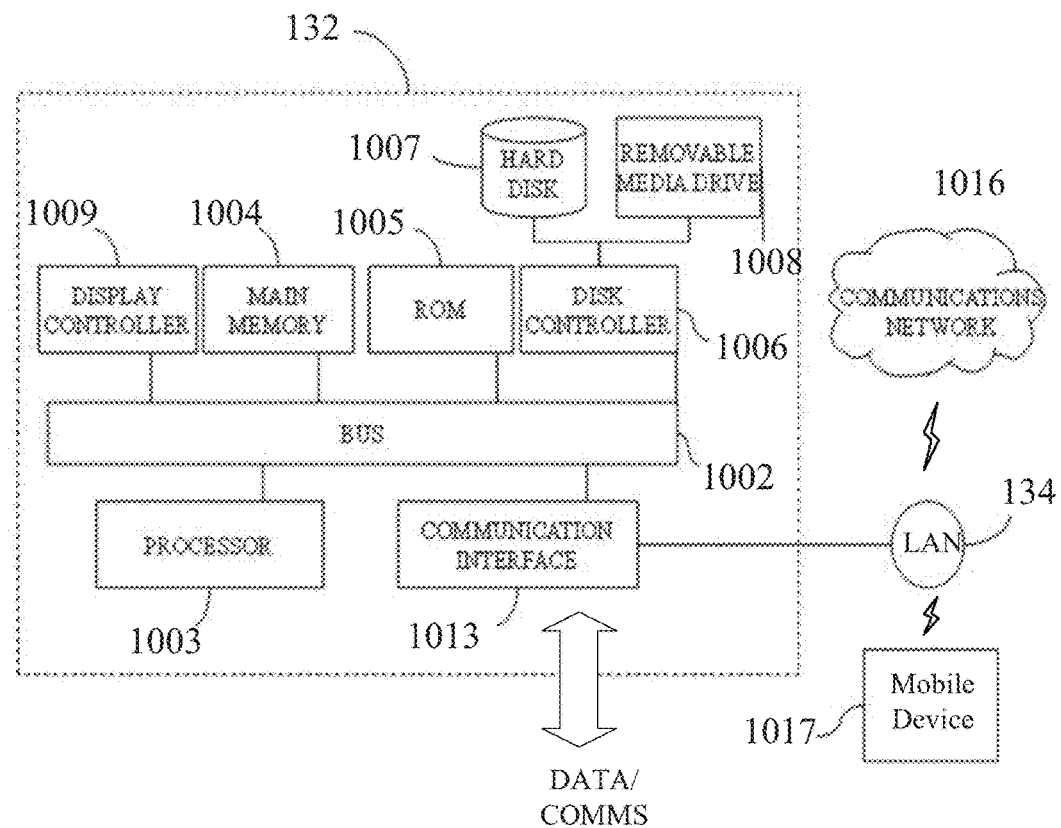
FIG. 10 depicts a computer system according to an embodiment.

As shown in FIG. 10, the computer system 132 includes a disk controller 1006 coupled to the bus 1002 to control one or more storage devices for storing information and instructions, such as a magnetic hard disk 1007, and a removable media drive 1008 (e.g., floppy disk drive, read-only compact disc drive, read/write compact disc drive, compact disc jukebox, tape drive, solid state drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 132 may also include special purpose logic devices (e.g., application specific integrated circuits (ASICs)) or configurable logic devices (e.g., simple programmable logic devices (SPLDs), complex programmable logic devices (CPLDs), field programmable gate arrays (FPGAs)), and graphics processing units (GPUs).

The computer system 132 may also include a display controller 1009 coupled to the bus 1002 to control a display. The display controller 1009 includes interfaces for input devices, such as a keyboard and a pointing device, for interacting with a computer user and providing information to the processor 1003. This would allow a user to simply interface with computer system 132, for example, in a laboratory or for field maintenance. The pointing device, for example, may be a mouse, a trackball, a finger for a touch screen sensor, or a pointing stick for communicating direction information and command selections to the processor 1003 and for controlling cursor movement on the display.

The processor 1003 executes one or more sequences of one or more instructions contained in a memory, such as the main memory 1004. Such instructions may be read into the main memory 1004 from another computer readable medium, such as a hard disk 1007 or a removable media drive 1008. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer system 132 includes at least one tangible computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 132, for driving a device or devices for implementing the invention, and for enabling the computer system 132 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1003 for execution. A computer readable medium may take many forms, including but not limited to, non-volatile media or volatile media. Non-volatile media includes, for example, optical, magnetic disks, and magneto-optical disks, such as the hard disk 1007 or the removable media drive 908. Volatile media includes dynamic memory, such as the main memory 1004. Transmission media, on the contrary, includes coaxial cables, copper wire and fiber optics, including the wires that make up the bus 1002. Transmission media also may also take the form of acoustic or light waves, such as those generated during radio wave and infrared data communications.

Various forms of computer readable media may be involved in carrying out one or more sequences of one or more instructions to processor 1003 for execution. For example, the instructions may initially be carried on a magnetic disk of a remote computer. The remote computer can load the instructions for implementing all or a portion of the present disclosure remotely into a dynamic memory and send the instructions wirelessly to a communications network 1016 via LAN (including communications circuitry) 134. The bus 1002 carries the data to the main memory 1004, from which the processor 1003 retrieves and executes the instructions. The instructions received by the main memory 1004 may optionally be stored on storage device 1007 or 1008 either before or after execution by processor 1003.

The computer system 132 also includes a communication interface 1013 coupled to the bus 1002. The communication interface 1013 provides a two-way data communication coupling to LAN 134 that is connected to, for example, a base station or another communications network, such as the Internet. For example, the communication interface 1013 may be a network interface card to attach to any packet switched LAN. As another example, the communication interface 1013 may be an integrated services digital network (ISDN) card. In any such implementation, the communication interface 1013 sends and receives electrical, electromagnetic or optical signals that carry digital data streams representing various types of information, such as data or control information from components of robot 100. Moreover, the LAN including communications circuitry 134 may provide a connection to a mobile device 1017 such as a personal digital assistant (PDA) laptop computer, or cellular telephone. Thus, the movement of the robot in the geographical region can be viewed and monitored on the mobile device 1017.

Figure 11:
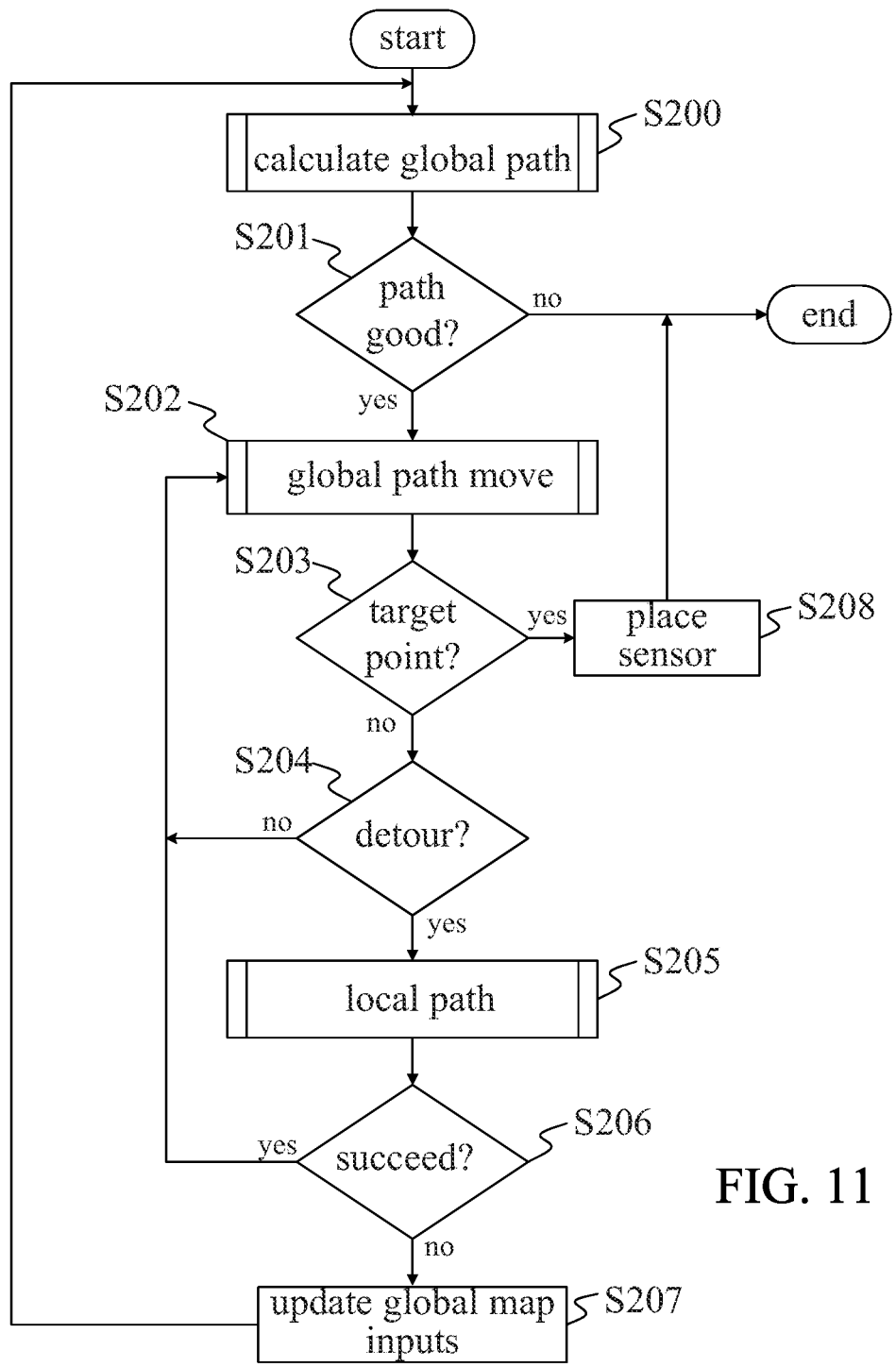
FIG. 11 depicts a flowchart outlining steps for deploying a sensor at a target point according to an embodiment.

FIG. 11 depicts a flowchart outlining the steps performed by the computer system in calculating and navigating a robot on a path from an initial point to a target point. In step S200, the computer system calculates the global path. A global path will always be computed as an optimal path, unless the robot's starting point is completely separated from the target point, that is, non-traversable regions completely block access to the target point and no path exists between the starting point and the target point.

In step 201, the computer system checks whether the global path satisfies a set of predetermined constraints. One example could be a maximum path length. Any path that exceeds the robot's ability to reach the target point on a single battery charge would require that the solar panel be able make up the difference. If such paths are considered too risky, for example, due to the magnitude of the battery power deficit relative to the solar array's ability to generate power, or due to cloudy conditions, which would interfere with solar energy generation, the optimal path may still be classified as unacceptable by the computer system, and the robot does not follow the determined global path. If it is determined that no satisfactory path exists, the process terminates. If a satisfactory global path is found, the robot follows the global path in step S202. Specifically, the computer system guides the robot along the computed global path.

At step S203, the computer system determines the current location of the robot using the GNSS/INS, and determines whether the robot is at the target point. If the current location of the robot is at the target point, then at step S208 the computer system uses the sensor handling assembly to deploy a seismic sensor at the target point. The computer system uses the soil test probe to determine a hardness of the soil beneath the robot. The robot uses an appropriate drill for the hardness of the soil as determined by the soil test result, and can cover the sensor using soil captured in the cylinder on the front of the chassis. The computer system may store the soil hardness test result in memory, tagged with position information, for future use.

If the computer system determines that the robot is not at the target point, then at step S204 the computer system determines whether a detour or local modification of the global path is required. At step S204, the computer system collects data with the imager, and processes the imagery for three-dimensional depth reconstruction to create a local terrain model. Various parameters may be calculated from the three-dimensional data for determining whether a detour or local modification of the global path is required.

In one embodiment, an area can be classified as either passable or unpassable based on a difference in elevation of the area relative to the level of the robot, and unpassable areas on the global path are detoured around. Additionally, by one embodiment, a surface normal could be generated to the three-dimensional terrain model, and a local inclination of the surface, $\theta$, is calculated from the model. An inclination $\theta$ along the global path which exceeds a threshold value indicates that a modification of the path, or detour, is necessary.

The computer system can also determine a hardness of the soil using the soil test assembly. The information regarding soil hardness may be used to determine whether a detour or local modification of the global path is required in conjunction with the local terrain model. For example, a soil test probe measurement result may be characterized as going from a value of 0, indicating no soil penetration, e.g., in rocky terrain, to a value of 1, indicating soil penetration to the maximum extent of the soil test probe, e.g., in sand or very loose soil. If the soil hardness measurement is characterized as $\eta$, then a condition such as $\eta \geq 0.9$, for example, can indicate that a detour or local modification of the global path is required if such soil is too soft for the robot's treads to work effectively.

The computer system can also determine that a detour or local modification of the global path is required at step S204 if, for example, there has been a dropout in the GNSS signal and when the signal is reacquired the computer system determines that the robot's location is not within a specified distance of the global path. If the determination is made by the computer system that no local modification of the global path is required at step S204, then the computer system returns to step S202.

If the computer system determines that a local modification of the global path is required, then in step S205 the computer system calculates an initial local path to detour around an obstacle in order to move back to the global path. The computer system uses the imager to capture images on the local path as the robot moves, and builds and updates a three-dimensional model of the terrain along the local path. The computer system uses a deterministic path finding algorithm to calculate the initial local path and to calculate updates to the path as more terrain data is constructed from the captured images. The search area of the deterministic path finding algorithm continues to expand as the computer system determines that paths are blocked or not traversable. The computer system finds a local path until either the computer system determines that the robot is back on the global path or until the search area expands to a point where the computer system determines that the robot is no longer in the same global map, at which point the computer system exits from step S205.

At step S206, a query is made to determine whether the local pathfinding in step S205 was successful (and the robot is back on the global path), or whether the local pathfinding in step S205 was unsuccessful and the robot has deviated from the global map. If the local path was successful, then the computer system returns to step S202. If the local path was unsuccessful, then the computer system continues to step S207.

If the local path was unsuccessful, then at step S207 the computer system updates the global path, for example, by marking the grid as non-traversable in the global map. The computer system then returns to step S200 and recalculates the global path using the updated global map.

Figure 12:
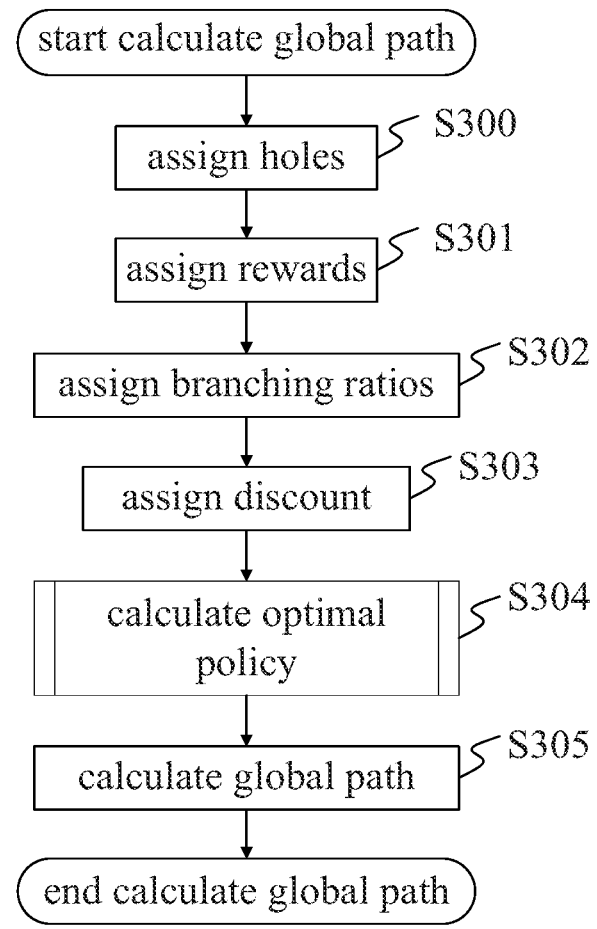
FIG. 12 depicts a flowchart outlining steps for determining a global path within a global map according to an embodiment.

FIG. 12 depicts a flowchart outlining the steps performed by the computer system for calculating a global path in a global map. The global path is calculated by the computer system using the global map via the determined optimal movement policy.

At step S300, the processor designates grid cells on the global map that are non-traversable. The non-traversable grid cells form "holes" in the global map through which no path can pass.

At step 301, reward values are assigned to the remaining grid cells. The reward values can be positive, negative, or zero. These values are based on the terrain of the map area corresponding to the grid cells and the capabilities of the robot to traverse the terrain at that location on the global map. The specific values for each type of terrain may be input based on past experience, calculated from models, or based on local measurements.

In one embodiment, the computer system calculates a local elevation variation, S, or roughness, of the surface using the equation $$S_j = \sqrt{\frac{1}{N}\sum_{i=1}^{N}(z_i - \bar{z})^2}$$

at the jth global grid square, where the N points summed over represent neighbors of the grid cell under consideration, $z_i$ represents an elevation of the ith neighboring grid square, and $\bar{z}$ represents the average value of the elevations of the jth global grid square and the neighboring squares. The reward function, $R_j$, at the jth global grid square is assigned as $R_j=-k \cdot S_j$, where k is a positive scaling constant, which is adjusted to produce the desired pathfinding results. The scaling constant k can be determined in advance using previous experimental or field data from the robot, or can be determined by conducting experiments with the robot in the actual terrain of the global map before the robot is used to deploy sensors. Such a reward function penalizes paths which traverse areas in which the terrain is rough.

In one embodiment, the reward function, $R_j$, at the jth global grid square is assigned as $R_j=-k \cdot \eta_j^2$, where $\eta_j$ is a local soil hardness and k is a positive scaling constant, which is adjusted to produce the desired pathfinding results. The scaling constant k can be determined in advance using previous experimental or field data from the robot, or can be determined by conducting experiments with the robot in the actual terrain of the global map before the robot is used to deploy sensors. Such a reward function penalizes paths which traverse areas in which the terrain is very soft.

In step S302, branching ratios are assigned for the grid cells. The branching ratios are the manner in which the stochastic element of the model is introduced, and indicate the likelihood that the robot will, in attempting to move in a particular direction, end up moving in a different direction instead. Various circumstances could cause the robot to move on other than the intended path. For example, during a GNSS signal dropout, the INS could accumulate error rapidly in an area with very rough terrain, causing the robot to move to a grid cell different from the next grid cell along the global path. The robot could also move to a grid cell different from the next grid cell along the global path, while attempting to make a local path correction to avoid an obstacle.

In step S303, the computer system may set a discount value for the grid cells. The discount value is a multiplicative factor less than one, which is applied to the reward value of a grid cell, and affects the value of rewards in the future. When the discount value is close to 1.0, the value of future rewards is equal to current rewards, and the resulting optimal movement policy may tend to have longer paths. As the discount value decreases, future rewards are more heavily discounted, and the resulting optimal movement policy will favor shorter paths.

The optimal movement policy is then calculated in step S304. The optimal movement policy gives the optimal direction to move toward the target point at each grid square in the global map. For instance, as shown in FIG. 8C, a movement direction is assigned for each grid cell.

At step S305, the global path is calculated. The global path is defined by a set of waypoints of GNSS coordinates which the robot will traverse in order to move from the initial point to the target point. For example, the global path could be the line moving through the centers of the grid squares in the global map along a direction that is determined by the optimal movement policy. Upon computing the global path, the process depicted in FIG. 12 terminates.

Figure 13:
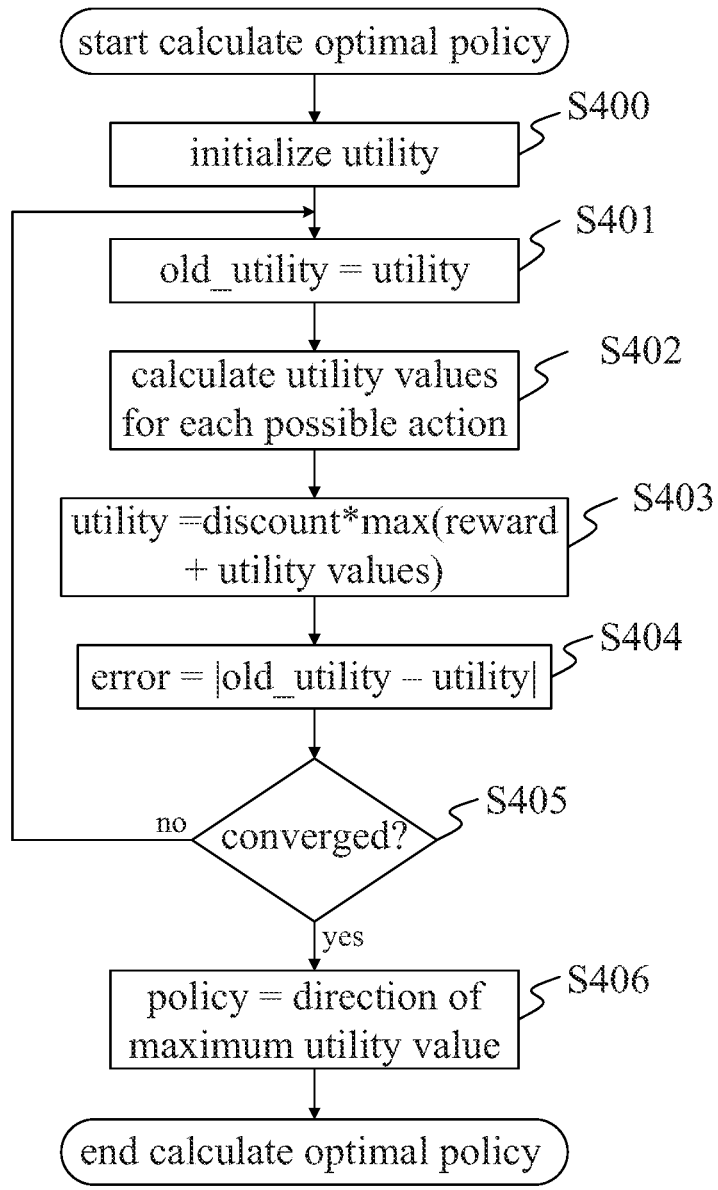
FIG. 13 depicts a flowchart outlining steps for calculating an optimal policy according to an embodiment.

FIG. 13 depicts a flowchart outlining the steps performed by the computer system for calculating an optimal movement policy according to an embodiment of the disclosure. In one embodiment, the algorithm for the calculation of an optimal movement policy includes modeling the global map as a Markov Decision Process and solving for the optimal movement policy using value iteration.

A Markov Decision Process (MDP) is defined by the following quantities: a set S of all states; a set A of all actions; a transition function P(s,a,s') specifying the probability that action a taken at state s results in state s', where a is an element of A, and s and s' are elements of S; a reward function R(s,a,s') specifying the immediate reward after a transition to a state s' from a state s; and a discount factor γ corresponding to a relative importance between future rewards and immediate rewards. In the MDP model, the set of all states S is the global map, the states s that belong to S are the grid cells within the global map, the set A of all actions is the set of all possible movement directions in the MDP model, and an action a is a movement in one of the possible movement directions in the MDP model. The discount factory γ is as discussed hereinabove.

A value iteration algorithm is used to solve the Markov Decision Process for an optimal policy. The value iteration algorithm begins by assigning an initial utility to each state, or grid cell, in S at step S400. The utility of a grid cell represents the discounted sum of future rewards on an optimal path from the grid cell to the target grid cell. The utility assigned is arbitrary, and for a discount factor γ<1, the algorithm always converges to an optimal policy, regardless of the initial utility assignments. For example, by one embodiment, all grid cells could be assigned an initial utility of 0.

Let $V_0$ denote the initial assignments of utilities to the set of states S, and $V_i$ denote the utilities of the set of states S after the ith iteration. At step S401, the computer system stores the current utilities in order to later calculate a difference change in utilities after an iteration, i.e., $|V_{i+1}-V_i|$.

At step S402, the computer system calculates the utility values at each traversable grid cell, except the target grid cell, for every possible action. A possible action is any possible direction of movement in the MDP model, except movements that may result in the robot moving to a non-traversable grid cell. That is, for every grid cell s, the computer system calculates $R(s)+\Sigma_a P(s, a, s')*\gamma V_i$ for every possible action a, where s' is the grid cell resulting from movement in direction a. Thus, there is one utility for each grid cell, and a plurality of utility values for each grid cell, with the number of utility values corresponding to the number of possible actions, or directions of movement, for each grid cell.

Further, as depicted in step S403, the computer system computes the updated utilities defined by $V_{i+1}(s)=R(s)+\max_a\{\Sigma_{s'}P(s, a, s')*\gamma V_i\}$, where i represents the iteration number, the sum is over all possible end states s' for each possible action a. So, the next set of utilities $V_{i+1}$ is determined by choosing the largest utility value for each state, that is, by choosing the action a at each state s which maximizes the quantity in brackets.

In step S404, the computer system calculates the change in utilities, or error, after the iteration as $|V_{i+1}-V_i|$. The error |•| can be defined as the absolute value of the maximum single difference over all states or the sum of the squares of the differences over all states, and the like.

In step S405, the computer system determines whether the iteration has converged by determining whether the error is less than a required value ϵ. If the error is not less than ϵ, then the computer system returns to step S401 and the above procedure is iterated until a difference (referred to herein as error in step S404) between the utilities from one iteration to the next falls below some required value, i.e., until $|V_{i+1}-V_i|<\epsilon$. If $|V_{i+1}-V_i|<\epsilon$, the computer system proceeds to step S406.

According to one embodiment, the computer system uses a discount factor γ such that 0≤γ<1, and the value iteration algorithm always converges. A discount factor closer to 1 may result in longer paths, which can risk exceeding the abilities of the robot's battery and solar panel to produce power; a discount factor closer to 0 may result in shorter, more aggressive paths which take the robot over more difficult terrain which the robot may fail to navigate. In practice, the discount factor γ is determined particular to the robot's battery and solar panel's power capabilities in view of the local conditions and power requirements to perform the robot's mission in order to balance these conflicting requirements.

In step S406, the movement policy is determined by assigning a direction of movement to each passable grid cell. The direction of movement assigned at each grid cell in the optimal policy is chosen as the direction which gives the maximum utility value for that cell. Upon determining the optimal movement policy, the process as depicted in FIG. 13 terminates.

Figure 14:
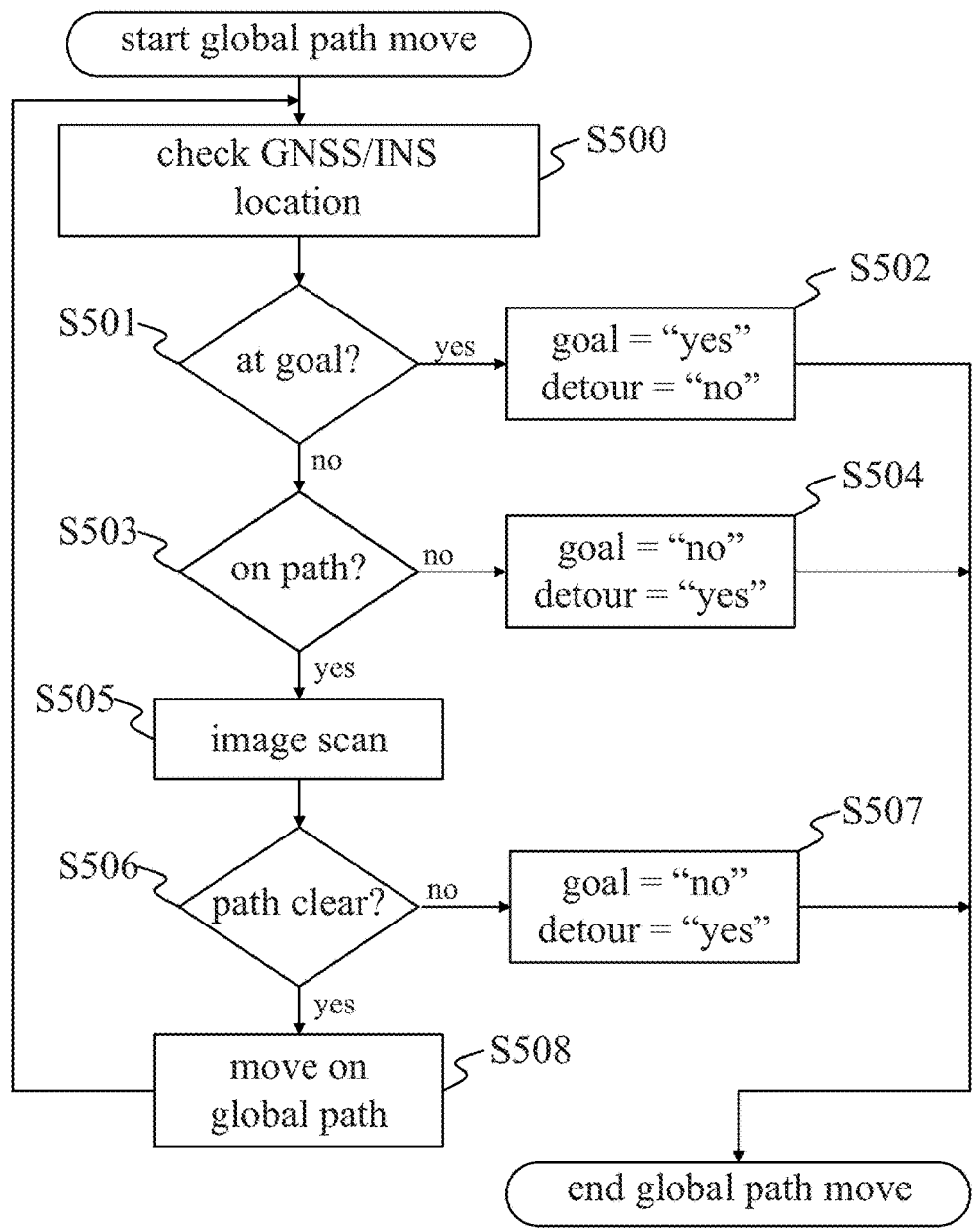
FIG. 14 depicts a flowchart outlining steps for global path movement according to an embodiment.

FIG. 14 depicts a flowchart outlining the steps performed by the computer system for global path movement according to an embodiment of the disclosure.

At step S500, the computer system determines the current location of the robot using the GNSS/INS receiver. The computer system determines whether the current location of the robot is in the same global grid cell that includes the target point at step S501. If yes, then the computer system sets goal equal to "yes" and detour equal to "no" and ends the global path movement.

If the computer system determines that the current location of the robot is not in the same grid cell that includes the target point at step S501, then the computer system determines whether the robot is on the global path in step S503. If the robot is not on the global path, the computer system sets goal equal to "no" and detour equal to "yes" (S504) and ends the global path movement.

If the computer system determines that the current location of the robot is on the global path (S505), then the path ahead of the robot is imaged using the imager to produce stereo imagery. The computer system processes the stereo imagery to produce a three-dimensional depth reconstruction of the path in front of the robot. The computer system may store the three-dimensional depth reconstruction in memory, for example, as a digital elevation map (DEM).

At step S506, the computer system uses the reconstruction of the path in front of the robot to determine whether the global path is clear. This determination may utilize a variety of factors which may be calculated by the computer system. The computer system also determines a hardness of the soil locally with the soil test assembly.

In one embodiment the computer system determines a local roughness of along the path by calculating a local variation, S, of the surface using the equation $$S_j = \sqrt{\frac{1}{N}\sum_{i=1}^{N}(z_i - \bar{z})^2}$$

at the jth point in the DEM, where the N points summed over are neighbors, $z_i$ represents an elevation of the ith neighboring point in the DEM, and $\bar{z}$ represents the average value of the elevations of the jth point and the neighboring points in the DEM. The computer system then determines that the path is clear if the local variation of the terrain along the path as calculated from the DEM is less than a maximum value which may be determined using the soil hardness measurement.

As an example, let us assume that a particular robot has a ground clearance under the chassis of twelve inches, and a soil test probe measurement result is characterized as going from 0, indicating no soil penetration, e.g., in rocky terrain, to 1, indicating soil penetration to the maximum extent of the soil test probe, e.g., in sand or very loose soil. Then the capabilities of the robot might lead to a rule for the computer system that if the soil hardness determination is greater than or equal to 0.75, the local surface variation must be less than or equal to six inches due to the robot's ability to traverse rocky ground. Similarly, there could be a rule for the computer system that if the soil hardness determination is less than or equal to 0.25, the local surface variation must be less than or equal to nine inches due to the robot's ability to traverse soft ground more easily than rocky ground.

In one embodiment, the computer system calculates surface normals to the DEM generated from the three-dimensional depth reconstruction along the global path, and determines that the path is clear if the inclination of the terrain along the path as calculated from the surface normals is everywhere less than a maximum value which may be determined using the soil hardness measurement.

As an example, the capabilities of the robot might lead to a rule for the computer system that if the soil hardness determination is greater than or equal to 0.75, the local surface inclination must be less than or equal to 30 degrees due to the robot's ability to traverse rocky ground. Similarly, there could be a rule for the computer system that if the soil hardness determination is less than or equal to 0.25, the local surface inclination must be less than or equal to 40 degrees due to the robot's ability to traverse soft ground more easily than rocky ground.

If the computer system determines at step S506 that the path is not clear, then the computer system sets goal to "no" and detour to "yes" and ends the global path movement. If the computer system determines at step S506 that the path is clear, then the computer system continues to step S508 and the robot moves along the global path, after which the computer system returns to step S500.

Figure 15:
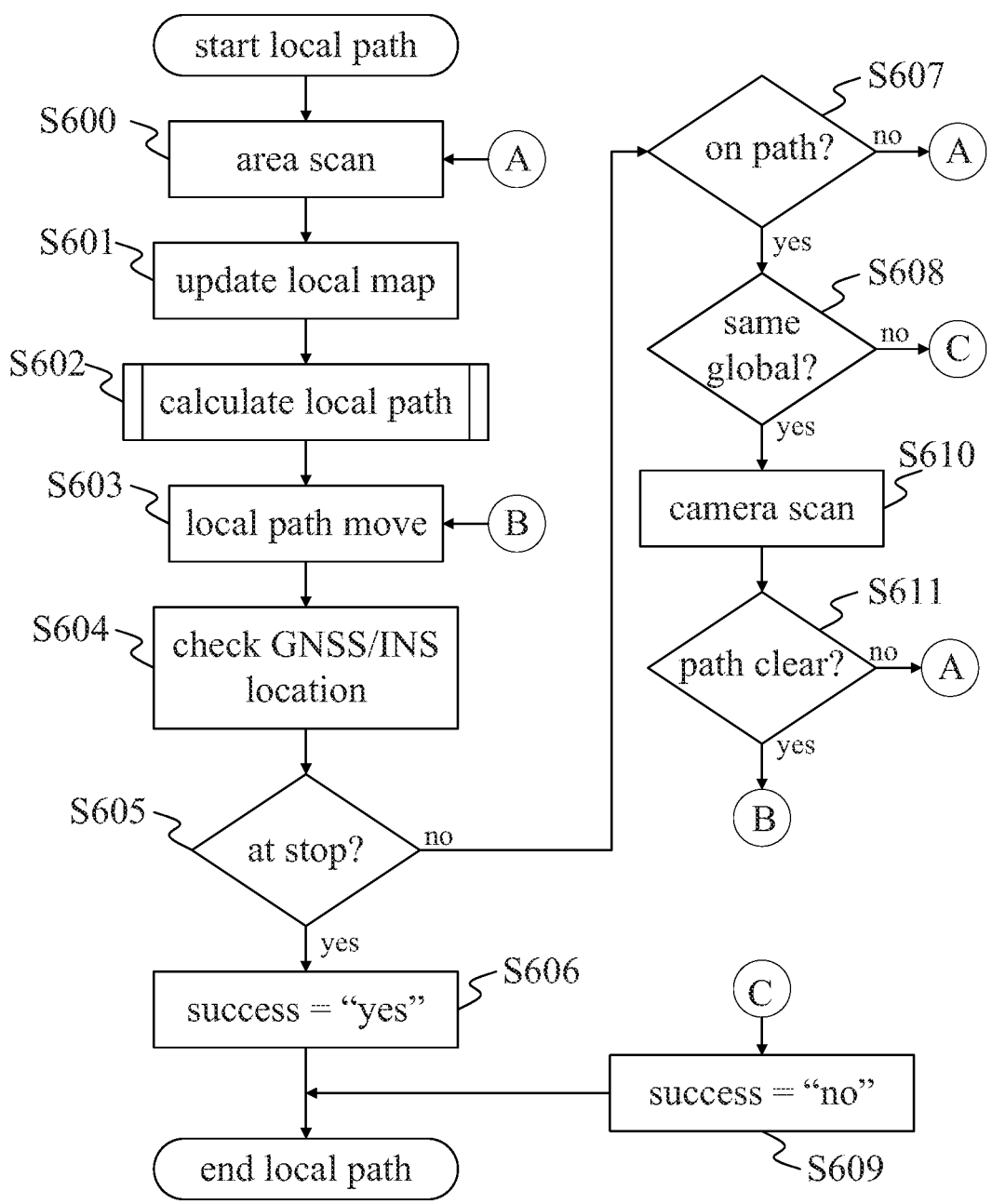
FIG. 15 depicts a flowchart outlining steps for local path movement according to an embodiment.

FIG. 15 depicts a flowchart outlining the steps performed by the computer system for determining and moving along a local path. The local path algorithm may be executed by the computer system, for example, if the computer system determines that there is an obstacle on the global path or if a position of the robot is determined not to be on the global path (for instance, the location of the robot has deviated more than a predetermined distance away from the global path). The local path is a detour path from the global path. For instance, as shown in FIG. 9B, the path represented as 902 is a local path that has a starting point and a terminating point that lie on the global path.

In step S600, a 360 degree area scan is performed using the imager to produce stereo imagery. The computer system processes the stereo imagery to produce a three-dimensional depth reconstruction of the area around the robot. The computer system may store the three-dimensional depth reconstruction in memory, for example, as a digital elevation map (DEM). The computer system uses the depth reconstruction data to create or update the local map in step S601, and then calculates and/or updates a local path in step S602. Details regarding the computation of the local path are described later with reference to FIG. 16.

In step S603, the robot moves along the local path. The computer system determines the current position of the robot using the GNSS/INS receiver at step S604.

At step S605 the computer system determines whether the current location is a point on the global path. If the computer system determines that the current location of the robot is back on the global path, then at step S606 the computer system sets success to "yes" and exits the local path algorithm. If at step S605 the computer system determines that the current location is not on the global path, then the algorithm moves to step S607.

At step S607, the computer system determines if the current location of the robot is still on the local path. If the computer system determines that the robot is no longer on the local path, then the algorithm returns to step S600 to re-scan the area. If the computer system determines that the robot is still on the local path, then the computer system determines whether the current location of the robot is in the same global map at step S608. If the computer system determines that the location of the robot is not in the same global map, then the computer system set success to "no" and exits the local path algorithm.

If the computer system determines that the location of the robot is still in the same global map grid square, then an imager scan is performed using the imager to produce stereo imagery in step S610. The computer system processes the stereo imagery to produce a three-dimensional depth reconstruction of the area around the robot. The computer system may store the three-dimensional depth reconstruction in memory, for example, as a digital elevation map (DEM).

Various parameters may be calculated from the three-dimensional data, for example, incorporating local soil hardness measurements, for determining whether a modification of the local path is required. In one embodiment, an area is classified as either passable or unpassable based on a difference in elevation of that area relative to the level of the robot. In one embodiment, a surface normal could be generated to the three-dimensional terrain model, and a local inclination of the surface is calculated from the model. An inclination along the path which exceeded a threshold value for the robot would indicate that a modification of the path was necessary. Soil hardness measurements could be incorporated into these measurements, for example, as indicated in the description of steps S505 and S506 in FIG. 14 above.

If the computer system determines in step S611 that the path is clear, then the computer system returns to step S603. If it is determined in step S611 that the path is not clear, then the computer system returns to step S600.

Figure 16:
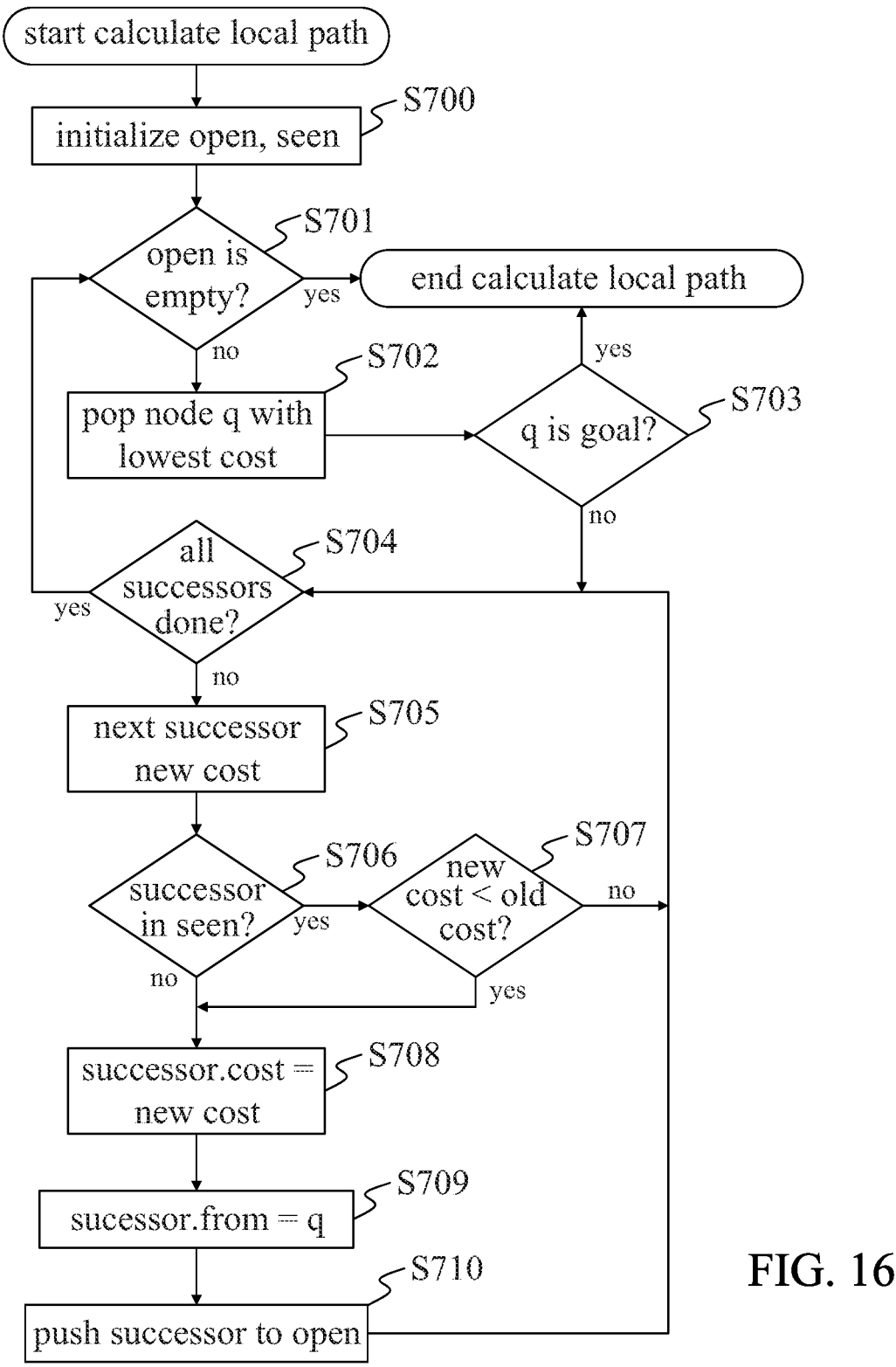
FIG. 16 depicts a flowchart outlining steps for local path determination according to an embodiment.

FIG. 16 depicts a flowchart outlining the steps performed by the computer system for calculating a local path according to a deterministic pathfinding algorithm in an embodiment of the disclosure. The deterministic local pathfinding algorithm used in one embodiment is the A* algorithm.

The A* algorithm is a graph search algorithm which associates a cost to paths between a start point and a goal point, and determines a path between the start point and the goal point with the lowest cost. A graph is a set of elements called points, or nodes, which are connected by lines. Each line of the graph has a cost associated with it. In one embodiment of the disclosure, the search area for the local path may be divided into a grid, the squares of the grid are identified with the nodes of the graph, and each node in the grid is connected to its nearest neighbors (for instance, each node may be connected to four of its adjacent neighbors). In other embodiments, each node in the rectangular grid can be connected to its eight nearest neighbors, or the local search area could be divided into a hexagonal grid. The local search area could also be an unstructured mesh generated from three-dimensional depth reconstruction, with the lines joining neighbors defined using fixed-radius nearest neighbors or k-nearest neighbors.

In the A* algorithm, the cost of a path from the start point to the goal point passing through a point p is the sum of the least costliest path found so far from the start point to p, which is known and may be calculated exactly, and an approximation of the cost of the path from p to the goal point, which is unknown and approximated by a heuristic function. Points in the A* algorithm are also referred to as nodes. A successor to a point q is an adjacent point to q, i.e., a neighbor of q as discussed above. When the costs of all successors to a point q have been calculated in the algorithm, we say that the algorithm has expanded point q.

The search in the A* algorithm begins at the start point and calculates the cost of a path through each of the neighboring points to the start point. The algorithm then chooses the neighboring point with the lowest cost, and calculates the cost of the paths through all the neighbors of that point. The search moves outward from the starting point in this fashion, at each step expanding the point with the lowest cost and calculating the cost of the paths through all neighboring points. For robotic pathfinding, the cost of a path may correspond to the path length, but the cost function is not limited to only the path length and other factors may also be included in the cost function, for example, local elevation variation or local soil hardness. In the following discussion, shorter and cheaper will be used synonymously to characterize cost or path length, as will longer and more costly, even though the costs associated with the paths and lines are not necessarily solely determined by length.

In the present embodiment, the cost function uses the distance between a pair of points as a basis for the cost of each line. As the computer system builds local map information from three-dimensional depth reconstruction of stereo imagery and local soil hardness data, the cost functions can be adjusted. The cost functions should be bounded from below, so the extra terms which contribute to the cost function will always be positive. In one embodiment, the extra terms contributing to the cost function are individual cost functions which represent factors such as local elevation variation or local soil hardness, and the total cost function is a sum of the distance and the individual cost functions.

In one embodiment the computer system determines a local roughness, or elevation variation, along the path by calculating a local variation, S, of the surface using the equation $$S_j = \sqrt{\frac{1}{N}\sum_{i=1}^{N}(z_i - \bar{z})^2}$$

at the jth point in the DEM, where the N points summed over are neighbors, $z_i$ represents an elevation of the ith neighboring point in the DEM, and $\bar{z}$ represents the average value of the elevations of the jth point and the neighboring points in the DEM.

In one embodiment, a soil test probe measurement result may be characterized as going from 0, indicating no soil penetration, e.g., in rocky terrain, to 1, indicating soil penetration to the maximum extent of the soil test probe, e.g., in sand or very loose soil, and the robot is better able to handle surface roughness on soft terrain than on rocky terrain. If the soil hardness measurement is characterized as η, then a cost function is given by $C_{\eta,s_j}=(2-\eta)^2 S_j^2$. The distance cost function can be represented by a distance metric, for example, by a Manhattan distance or Euclidean distance. The Euclidean metric between two points $(x_0,y_0)$ and $(x_1,y_1)$, is $C_d=\sqrt{(x_1-x_0)^2+(y_1-y_0)^2}$ to represent the distance portion of the cost function, then the overall cost function for moving from $(x_0,y_0)$ to $(x_1,y_1)$ could be computed as $C=k_1C_d+k_2C_{n,s}$, where $C_{n,s}$ is evaluated at $(x_1,y_1)$ and $k_1$ and $k_2$ are positive relative weight factors which could be used to establish a relative importance of the two terms in the cost function.

The computer system begins the calculation of a local path by initializing "open" and "seen" objects in step S700. These may be implemented in a computer program, for example, as lists, dictionaries, stacks, queues, double-ended queues or deques, heaps, or priority queues. "Seen" corresponds to a list of points that have been expanded together with their cost, which is the calculated portion of the cost function plus the heuristic. "Open" includes a list of candidate points on the "frontier" of the search area as it expands outward. As points are expanded, they are removed from the "open" list. The "open" list initially includes only the start point, the initial cost of which may be initialized to zero.

In one embodiment, the "seen" object has attributes "cost" and "from," where for a node a appearing in "seen," a.cost gives the cost at node a and a.from gives the node from which a follows on the shortest path back to the start node. These properties of the nodes could also be tracked using various other data structures or methods known to one of ordinary skill in the art.

At step S701, the computer system determines whether the "open" list is empty. If the computer system determines that the "open" list is empty, then the computer system exits the local path calculation. A determination that the "open" list is empty before the goal has reached indicates that there is no path to the goal. If the determination is made that "open" is not empty, then the computer system proceeds to step S702.

At step S702, the computer system pops the node having the lowest cost from "open." Popping the node from "open" indicates that the identity of the node has been retrieved and that the node has been removed from the "open" list. The computer system determines if node q is the goal at step S703. If node q represents the goal, then the path has been found and the computer system exits the routine. If q is not the goal, then the computer system proceeds to step S704.

At step S704, the computer system determines whether all successors to q have been analyzed. If yes, then the computer system returns to step S701. If not, then the computer system continues to step S705.

At step S705, the computer system calculates the new cost of the next successor to q. The cost of the successor is the cost to reach the successor, which is the cost of q plus the cost of the line joining q and the current successor, plus the estimated cost to reach the goal from q, which is given by the heuristic. The computer system determines whether the current successor is an element of "seen" at step S706.

If yes, which indicates that a cost has already been calculated for the current successor node, then at step S707 the computer system determines if the new cost is lower than the old cost. If the new cost is lower than the old cost, this indicates that a new route has been discovered to a previously seen node, and the new route is shorter than the old route. If the new cost is not less than the old cost, then the computer system returns to step S704. If at step S707 the new cost is less than the old cost, or at step S706 the successor node is not an element of "seen," then the computer system proceeds to step S708.

At step S708, the computer system assigns the value of the new cost to the successor node. If the current successor node is not an element of "seen," then in this step the computer system adds the current successor to "seen" and records its cost. If the current successor node is already an element of "seen," then the computer system replaces the old cost with the new cost.

At step S709, the computer system identifies node q as the node from which the successor came. Thus, the computer system tracks which node each successor node came from on the shortest path back to the start node. Once the computer system has located the goal node, the chain of "from" attributes will be used to trace the shortest path back to the start node.

At step S710, the computer system pushes the successor node to "open." In this manner, the successor node will be expanded if its cost is or becomes lower than the cost of the other nodes in the open list. This is equally true whether the successor node is newly seen or a new, shorter path has been found to an old node. The computer system then returns to step S704.

In the manner described above, a sensor may be deployed at a target point via robot by calculating an optimal path on a global map using a Markov decision process, detecting obstacles on the global path using stereo vision and depth reconstruction, and using a local deterministic pathfinding algorithm to detour around detected obstacles.

It must be appreciated that several modifications of the teachings of the present disclosure may be made without departing from the scope of the disclosure. For example, the choice and arrangement of the components of the robot as depicted herein could be modified. As long as the robot is able to deploy sensors and calculate paths as described herein, modifications of the robot are considered to fall within the scope of the present disclosure. For example, the robot could be wheeled instead of tracked, various motors and motor controllers could be added to the robot to function in a manner described above. Such modifications of the robot are well within the scope of the present disclosure.

Various methods could also be used for acquiring a three-dimensional terrain model. LIDAR, RADAR, synthetic aperture radar (SAR), or terrain maps and the like could be used. Three-dimensional depth reconstruction may also be performed using a single camera instead of implementing a stereo computer vision. Furthermore, the local path may be computed using deterministic pathfinding algorithms such as a brute-force search, breadth first search, Dijkstra's algorithm, and D*.

While certain embodiments have been described, these embodiments are presented by way of example only, and are not intended to limit the scope of the disclosure. Indeed, using the teachings in this disclosure, a person having ordinary skill in the art could modify and adapt the disclosure in a various ways, making omissions, substitutions and changes in the form of the embodiments described herein without departing from the spirit of the disclosure. The accompanying claims and their equivalents are intended to cover such forms or modifications as would fall within the scope and spirit of the disclosure.

The invention claimed is:

1. A robot for automated deployment of a seismic sensor in a geographic region, the robot comprising:
   a satellite receiver and a plurality of inertial sensors configured to determine at least one of a location and an orientation of the robot;
   an imager configured to capture images; and
   circuitry configured to:
   generate a map of the geographic region, wherein the map includes a plurality of grid cells, a first grid cell including an initial starting point of the robot and a last grid cell including a target point corresponding to a location for deploying the seismic sensor,
assign each grid cell a reward value based on at least one of a surface elevation of the geographic region in the grid cell and a soil hardness factor of the geographic region in the grid cell,
compute iteratively, a plurality of utility values for each grid cell, an utility value of the plurality of utility values corresponding to a movement of the robot from the grid cell to an adjacent grid cell, each utility value being computed based on a corresponding reward value of the grid cell and a discount factor, wherein a magnitude of the plurality of utility values is equal to a number of neighboring grid cells of the grid cell,
determine an action for each grid cell of the plurality of grid cells based on the computed utility values of each grid cell, wherein the action is an expected direction of movement of the robot in the grid cell, the expected direction of movement in the grid cell maximizing a discounted sum of reward values of the grid cells,
compute, based on the determined actions, a global path as a concatenation of actions of each grid cell starting from the first grid cell and terminating at the last grid cell,
monitor a current location of the robot based on at least one of the satellite receiver and the plurality of inertial sensors, to determine whether a deviation of the robot from the global path exceeds a predetermined threshold deviation, and
compute a second path for the robot based on at least one of the monitored location of the robot when the deviation of the robot from the global path exceeds the predetermined threshold deviation and an obstacle being detected in the global path by the imager.

2. The robot of claim 1, wherein a magnitude of the reward value of the grid cell indicates a level of ease of movement of the robot in the grid cell.

3. The robot of claim 2, wherein the circuitry is further configured to
classify each grid cell of the plurality of grid cells as one of a passable grid cell and a non-passable grid cell based on the surface elevation of the geographic region of the grid cell.

4. The robot of claim 1, wherein the discounted reward value of the grid cell is computed by multiplying a discount parameter to the assigned reward value of the grid cell.

5. The robot of claim 4, wherein the circuitry is further configured to
apply the discount factor to the assigned reward values of each grid cell based on a battery life of the robot.

6. The robot of claim 1, wherein the circuitry is further configured to
calculate at least one of a surface normal to the map and a surface roughness of the map; and
determine the second path based on one of an angle of the surface normal to the map and the surface roughness of the map.

7. The robot of claim 1, wherein the circuitry is further configured to
control a penetration of a soil test probe in the grid cell to determine the hardness factor of soil in the grid cell.

8. A method of automated deployment of a seismic sensor in a geographic region by a robot, the method comprising:
determining, by a satellite receiver and a plurality of inertial sensors, at least one of a location and an orientation of the robot;
capturing by an imager, images of the geographic region;
generating by circuitry, a map of the geographic region, wherein the map includes a plurality of grid cells, a first grid cell including an initial starting point of the robot and a last grid cell including a target point corresponding to a location for deploying the seismic sensor;
assigning each grid cell a reward value based on at least one of a surface elevation of the geographic region in the grid cell and a soil hardness factor of the geographic region in the grid cell,
computing iteratively, a plurality of utility values for each grid cell, an utility value of the plurality of utility values corresponding to a movement of the robot from the grid cell to an adjacent grid cell, each utility value being computed based on a corresponding reward value of the grid cell and a discount factor, wherein a magnitude of the plurality of utility values is equal to a number of neighboring grid cells of the grid cell,
determining an action for each grid cell of the plurality of grid cells based on the computed utility values of each grid cell, wherein the action is an expected direction of movement of the robot in the grid cell, the expected direction of movement in the grid cell maximizing a discounted sum of reward values of the grid cells,
computing, based on the determining, a global path as a concatenation of actions of each grid cell starting from the first grid cell and terminating at the last grid cell,
monitoring a current location of the robot based on at least one of the satellite receiver and the plurality of inertial sensors, to determine whether a deviation of the robot from the global path exceeds a predetermined threshold deviation, and
computing a second path for the robot based on at least one of the monitored location of the robot when the deviation of the robot from the global path exceeds the predetermined threshold deviation and an obstacle being detected in the global path by the imager.

9. The method of claim 8, further comprising:
classifying by circuitry, each grid cell of the plurality of grid cells as one of a passable grid cell and a non-passable grid cell based on the surface elevation of the geographic region of the grid cell.

10. The method of claim 8, further comprising:
calculating by circuitry, at least one of a surface normal to the map and a surface roughness of the map; and
determining the second path based on one of an angle of the surface normal to the map and the surface roughness of the map.

11. The method of claim 8, further comprising:
applying the discount factor to the assigned reward values of each grid cell based on a battery life of the robot.

12. A non-transitory computer readable medium having stored thereon a program that when executed by a computer causes the computer to execute a method of automatically deploying a seismic sensor in a geographic region by a robot, the method comprising:
determining at least one of a location and an orientation of the robot;
capturing images of the geographic region;
generating a map of the geographic region, wherein the map includes a plurality of grid cells, a first grid cell including an initial starting point of the robot and a last grid cell including a target point corresponding to a location for deploying the seismic sensor;

assigning each grid cell a reward value based on at least one of a surface elevation of the geographic region in the grid cell and a soil hardness factor of the geographic region in the grid cell, computing iteratively, a plurality of utility values for each grid cell, an utility value of the plurality of utility values corresponding to a movement of the robot from the grid cell to an adjacent grid cell, each utility value being computed based on a corresponding reward value of the grid cell and a discount factor, wherein a magnitude of the plurality of utility values is equal to a number of neighboring grid cells of the grid cell, determining an action for each grid cell of the plurality of grid cells based on the computed utility values of each grid cell, wherein the action is an expected direction of movement of the robot in the grid cell, the expected direction of movement in the grid cell maximizing a discounted sum of reward values of the grid cells, computing, based on the determining, a global path as a concatenation of actions of each grid cell starting from the first grid cell and terminating at the last grid cell, monitoring a current location of the robot based on at least one of the satellite receiver and the plurality of inertial sensors, to determine whether a deviation of the robot from the global path exceeds a predetermined threshold deviation, and computing a second path for the robot based on at least one of the monitored location of the robot when the deviation of the robot from the global path exceeds the predetermined threshold deviation and an obstacle being detected in the global path by the imager.

13. The non-transitory computer readable medium of claim 12, wherein the method further comprises:
calculating at least one of a surface normal to the map and a surface roughness of the map; and
determining the second path based on one of an angle of the surface normal to the map and the surface roughness of the map.

14. The non-transitory computer readable medium of claim 12, wherein the method further comprises:
applying the discount factor to the assigned reward values of each grid cell based on a battery life of the robot.

* * * * *